(12) United States Patent
Lin et al.

(10) Patent No.: US 11,490,387 B2
(45) Date of Patent: Nov. 1, 2022

(54) COMMUNICATION METHOD AND COMMUNICATIONS APPARATUS

(71) Applicant: HUAWEI TECHNOLOGIES CO., LTD., Guangdong (CN)

(72) Inventors: Nizhong Lin, Shanghai (CN); Lingli Pang, Shanghai (CN); Xian Zhang, Shanghai (CN); Zhang Zhang, Shanghai (CN); Xinzheng Wang, Shanghai (CN); Xinyou Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 281 days.

(21) Appl. No.: 16/744,656

(22) Filed: Jan. 16, 2020

(65) Prior Publication Data

US 2020/0154437 A1   May 14, 2020

Related U.S. Application Data

(63) Continuation of application No. PCT/CN2018/092692, filed on Jun. 25, 2018.

(30) Foreign Application Priority Data

Jul. 17, 2017 (CN) .......................... 201710582800.2

(51) Int. Cl.
*H04W 72/04* (2009.01)
*H04W 4/80* (2018.01)
(Continued)

(52) U.S. Cl.
CPC ....... *H04W 72/0453* (2013.01); *H04L 1/1614* (2013.01); *H04L 1/1642* (2013.01);
(Continued)

(58) Field of Classification Search
None
See application file for complete search history.

(56) References Cited

U.S. PATENT DOCUMENTS 10,917,214 B2 * 2/2021 Hwang ................ H04W 4/00
2013/0114508 A1   5/2013 Liang
(Continued)

FOREIGN PATENT DOCUMENTS

CN   102378370 A   3/2012
CN   102547718 A   7/2012
(Continued)

OTHER PUBLICATIONS

3GPP TS 36.101 V14.4.0 (Jun. 2017), "3rd Generation Partnership Project;Technical Specification Group Radio Access Network; Evolved Universal Terrestrial Radio Access (E-UTRA); User Equipment (UE) radio transmission and reception (Release 14)," Jun. 2017, 1449 pages.

(Continued)

*Primary Examiner* — Willie J Daniel, Jr.
(74) *Attorney, Agent, or Firm* — Fish & Richardson P.C.

(57) ABSTRACT

Example communication methods and apparatus that are applied to discrete narrowband communication information are described. One example communication method includes sending first indication information to a terminal by a network device. The first indication information includes a frequency channel number of a start sub-band in all discrete sub-bands of a serving cell in which the terminal is currently located, a bitmap representing whether each sub-band in a frequency band belongs to the serving cell, and a frequency spacing between sub-bands in the frequency band. The frequency band is a frequency band to which all the discrete sub-bands of the serving cell belong. The network device sends second indication information to the terminal, wherein the second indication information is used (Continued)

to indicate a sub-band available to the terminal in all the discrete sub-bands of the serving cell.

22 Claims, 9 Drawing Sheets

(51) Int. Cl.
*H04L 1/16* (2006.01)
*H04L 5/00* (2006.01)
*H04W 8/24* (2009.01)

(52) U.S. Cl.
CPC ............. *H04L 5/0094* (2013.01); *H04W 4/80* (2018.02); *H04W 8/24* (2013.01); *H04W 72/042* (2013.01)

(56) References Cited

U.S. PATENT DOCUMENTS

| | | |
|---|---|---|
| 2017/0111860 A1 | 4/2017 | Ang et al. |
| 2018/0076872 A1 | 3/2018 | Ll et al. |
| 2018/0248668 A1 | 8/2018 | Hwang et al. |

FOREIGN PATENT DOCUMENTS

| | | |
|---|---|---|
| CN | 103052076 A | 4/2013 |
| CN | 103298121 A | 9/2013 |
| CN | 103347301 A | 10/2013 |
| CN | 103906243 A | 7/2014 |
| CN | 104270767 A | 1/2015 |
| CN | 105611538 A | 5/2016 |
| CN | 105813203 A | 7/2016 |
| CN | 106330262 A | 1/2017 |
| CN | 106937390 A | 7/2017 |
| WO | 2016183950 A1 | 11/2016 |
| WO | 2017030345 A1 | 2/2017 |
| WO | 2017043876 A1 | 3/2017 |

OTHER PUBLICATIONS

Extended European Search Report issued in European Application No. 18835649.7 dated May 25, 2020, 9 pages.
LG Electroncs, "Further details on narrowbands and frequency hopping," 3GPP TSG RAN WG1 Meeting #82, R1-154227, Beijing, China, Aug. 24-28, 2015, 8 pages.
Office Action issued in Chinese Application No. 201710582800.2 dated May 11, 2020, 15 pages (with English translation).
PCT International Search Report and Written Opinion issued in International Application No. PCT/CN2018/092692 dated Sep. 13, 2018, 15 pages (with English translation).
Office Action issued in Chinese Application No. 201710582800.0 dated Aug. 17, 2021, 4 pages.

\* cited by examiner

| Logical sub-band number | 0 | 1 | 2 | 3 | ... | 20 | 21 | 22 | 23 | 24 | 25 | 26 | 27 | ... | 44 | 45 | 46 | 47 | 48 | 49 | 50 | 51 | ... | 68 | 69 | 70 | 71 | 72 | 73 | 74 | 75 | ... | 92 | 93 | 94 | 95 |
|---|---|---|---|---|---|---|---|---|---|---|---|---|---|---|---|---|---|---|---|---|---|---|---|---|---|---|---|---|---|---|---|---|---|---|---|---|
| Physical sub-band number in a slot 0 | 0 | 4 | 8 | 12 | ... | 80 | 84 | 88 | 92 | 1 | 5 | 9 | 13 | ... | 81 | 85 | 89 | 93 | 2 | 6 | 10 | 14 | ... | 82 | 86 | 90 | 94 | 3 | 7 | 11 | 15 | ... | 83 | 87 | 91 | 95 |
| Physical sub-band number in a slot 1 | 2 | 6 | 10 | 14 | ... | 82 | 86 | 90 | 94 | 3 | 7 | 11 | 15 | ... | 83 | 87 | 91 | 95 | 0 | 4 | 8 | 12 | ... | 80 | 84 | 88 | 92 | 1 | 5 | 9 | 13 | ... | 81 | 85 | 89 | 93 |

FIG. 4

COMMUNICATION METHOD AND COMMUNICATIONS APPARATUS

CROSS-REFERENCE TO RELATED APPLICATIONS

This application is a continuation of International Application No. PCT/CN2018/092692, filed on Jun. 25, 2018, which claims priority to Chinese Patent Application No. 201710582800.2, filed on Jul. 17, 2017. The disclosures of the aforementioned applications are hereby incorporated by reference in their entireties.

TECHNICAL FIELD

This application relates to the field of communications technologies, and in particular, to a communication method and a communications apparatus.

BACKGROUND

An existing discrete narrowband communications system supports only single-carrier data transmission. Restricted by excessively narrow spectrum resources, for example, a bandwidth of a single carrier in a spectrum in a power system is only 25 kHz, the current discrete narrowband communications system can support only low-rate services, and therefore can support limited communications applications. However, with growing service requirements, for example, a power distribution automation service in the electric power industry, video surveillance, or another service that requires a relatively high rate, a new communications technology is required, to support high-rate data transmission by using a discrete narrowband spectrum.

SUMMARY

Embodiments of this application provide a communication method and a communications apparatus, to aggregate discrete sub-bands in a discrete narrowband communications system, to support high-rate data transmission by using a discrete narrowband spectrum.

According to a first aspect, a communication method is provided. In the communication method, a network device sends, to a terminal, first indication information used to indicate frequency channel numbers of all discrete sub-bands of a serving cell in which the terminal is currently located. The terminal receives the first indication information sent by the network device, and may determine the frequency channel numbers of all the discrete sub-bands of the cell based on the first indication information. The network device sends, to the terminal, second indication information used to indicate a sub-band available to the terminal in all the discrete sub-bands of the cell. The terminal receives the second indication information sent by the network device, may determine, based on the second indication information, the sub-band available to the terminal in all the discrete sub-bands of the cell, and may further transmit data in the available sub-band. In this way, discrete sub-bands are aggregated to support high-rate data transmission.

In a possible design, the network device may add one of the following information to the first indication information, to indicate the frequency channel numbers of all the discrete sub-bands of the serving cell in which the terminal is currently located:

Manner 1: The first indication information sent by the network device to the first terminal includes a frequency channel number of a start sub-band of the current serving cell of the terminal, a bitmap representing whether each sub-band in a frequency band belongs to the current serving cell, and a frequency spacing between sub-bands in the frequency band, where the frequency band is a frequency band to which all the discrete sub-bands of the current serving cell belong.

The start sub-band of the current serving cell of the terminal may be the first discrete sub-band in all the discrete sub-bands of the cell, or may be the first sub-band in the frequency band to which all the discrete sub-bands of the cell belong. The frequency spacing is an absolute value of a difference between center frequencies of two sub-bands.

Manner 2: A fixed frequency spacing is set in a predefined manner, and the first indication information sent by the network device to the first terminal includes a frequency channel number of a start sub-band of the current serving cell of the terminal and a bitmap representing whether each sub-band in a frequency band belongs to the cell, where the frequency band is a frequency band to which all the discrete sub-bands of the current serving cell belong.

Manner 3: In addition to including the frequency channel number of the start sub-band and the bitmap representing whether each sub-band in the frequency band belongs to the cell that are mentioned above, or including the frequency channel number of the start sub-band, the bitmap representing whether each sub-band in the frequency band belongs to the cell, and the frequency spacing between the sub-bands in the frequency band that are mentioned above, the first indication information sent by the network device to the first terminal may further include a quantity of all the discrete sub-bands of the current serving cell of the terminal, so that after determining that the quantity of all the discrete sub-bands that belong to the current serving cell and that are in the frequency band has been indicated, the network device may not indicate a remaining sub-band that does not belong to the current serving cell of the terminal and that is in the frequency band.

Manner 4: The first indication information sent by the network device to the first terminal includes at least one piece of sub-band cluster indication information, where the sub-band cluster indication information includes start sub-band information of a sub-band cluster, a bitmap representing whether each sub-band in the sub-band cluster belongs to the cell, and a frequency spacing between sub-bands in the sub-band cluster.

In this embodiment of this application, when the sub-band cluster includes M consecutive sub-bands that do not belong to the current serving cell of the terminal, the sub-band cluster indication information may be used for indication, to further reduce indication overheads of the M consecutive sub-bands that are in the bitmap and that do not belong to the current serving cell.

After the network device indicates the frequency channel numbers of all the discrete sub-bands of the current serving cell of the terminal, and the terminal receives the first indication information, based on the frequency channel number of the start sub-band of the current serving cell of the terminal, the bitmap representing whether each sub-band in the frequency band belongs to the cell, and the frequency spacing between the sub-bands in the frequency band, where the frequency band is a frequency band to which all the discrete sub-bands of the current serving cell of the terminal belong.

In another possible design, the network device may add one of the following information to the second indication information, to indicate a sub-band available to the terminal in all the discrete sub-bands of the current serving cell:

Manner 1: The second indication information sent by the network device to the terminal may include a sequence number of a start sub-band available to the terminal in all the discrete sub-bands of the current serving cell and a quantity of sub-bands available to the terminal.

The network device may allocate, to the terminal, a specified quantity of consecutive logical sub-bands in all the discrete sub-bands of the current serving cell of the terminal, and use the specified quantity of consecutive logical sub-bands as discrete sub-bands available to the terminal. If all the discrete sub-bands of the serving cell of the terminal are numbered in sequence, the consecutive logical sub-bands are a specified quantity of sub-bands with consecutive numbers in all the discrete sub-bands of the cell.

Manner 2: The second indication information sent by the network device to the terminal includes a bitmap representing each corresponding sub-band available to the terminal in all the discrete sub-bands of the current serving cell of the terminal.

In a possible design, the terminal may send sub-band aggregation specification capability information to the network device, where the sub-band aggregation specification capability information is used to indicate a quantity of sub-bands of which aggregation is supported by the terminal. The network device receives the sub-band aggregation specification capability information sent by the terminal, may allocate an available discrete sub-band to the terminal based on a sub-band aggregation specification capability supported by the terminal, and then indicates, to the terminal, information about the available sub-band in all the discrete sub-bands of the current serving cell.

In another possible design, alternatively, the network device may allocate an available discrete sub-band to the terminal based on at least one of a load status of the current serving cell of the terminal, a current service requirement of the terminal, and the like, and send the second indication information to the terminal, to indicate the discrete sub-band available to the terminal in all the discrete sub-bands of the current serving cell.

In another possible design, if all the discrete sub-bands of the current serving cell of the terminal are discrete sub-bands available to the terminal, the network device may not send the foregoing mentioned second indication information to the terminal. When the terminal does not receive the second indication information sent by the network device, the terminal may consider by default that all the discrete sub-bands of the current serving cell of the terminal are discrete sub-bands available to the terminal.

After the network device indicates, in the foregoing manners, information about the sub-band available to the terminal in all the discrete sub-bands of the current serving cell, the terminal may determine the available discrete sub-band, and transmit data in the available discrete sub-band, to perform communication in a discrete sub-band aggregation communication manner.

When the terminal performs communication in the discrete sub-band aggregation communication manner, in a possible design, the terminal may select a sub-band from sub-bands that are available to the terminal and that are determined based on the second indication information, to receive PDCCH information, and transmit data in the determined available sub-bands.

When the terminal performs communication in the discrete sub-band aggregation communication manner, in another possible design, the network device may select a specified quantity of sub-bands from sub-bands available to the terminal as sub-bands available to a PDSCH, so that the PDSCH may also be indicated to the terminal in the discrete sub-band aggregation communication manner, where the sub-bands available to the PDSCH may be indicated by using a PDCCH.

When performing communication in the discrete sub-band aggregation communication manner, the terminal may use a frequency hopping mechanism, and always send and receive data in a sub-band with a corresponding logical sub-band number. Cyclic shift is performed between a logical sub-band number and an actual physical sub-band number based on a subframe number or a slot number, to distribute data transmission on a plurality of sub-bands in frequency, thereby obtaining a frequency diversity gain and alleviating deep fading.

The network device may send the first indication information to the terminal by using system information. The terminal may receive, by using the system information sent by the network device, the first indication information sent by the network device.

The network device may send the second indication information by using dedicated signaling after an RRC connection is established. The terminal may receive, by using the dedicated signaling sent by the network device, the second indication information sent by the network device.

In another possible design, the network device may further send third indication information to the terminal, where the third indication information is used to indicate at least one piece of anchor sub-band information. The anchor sub-band information may include at least one of a frequency channel number of an anchor sub-band, a sequence number of the anchor sub-band in all the discrete sub-bands of the current serving cell of the terminal, and a spacing of the frequency channel number of the anchor sub-band relative to the frequency channel number of the start sub-band of the current serving cell of the terminal.

The terminal receives the third indication information sent by the network device, determines at least one anchor sub-band based on the third indication information, and selects an anchor sub-band with optimal performance from the determined at least one anchor sub-band, to obtain initial access information such as a synchronization signal, a MIB, or a SIB. In this way, the terminal can select an anchor sub-band with optimal performance from a plurality of anchor sub-bands to obtain initial access information, thereby alleviating deep fading in the discrete narrowband communications system.

The network device may send the third indication information by using system information. The terminal receives the third indication information by using the system information.

In another possible design, the network device may further send fourth indication information to the terminal, where the fourth indication information is used to indicate a sub-band in which the terminal receives a system message. The fourth indication information carries one of the following information, to indicate the sub-band in which the terminal receives the system message: The fourth indication information includes the frequency channel number of the start sub-band in which the terminal receives the system message and a bitmap representing whether the terminal can receive the system information. Alternatively, the fourth indication information includes a frequency channel number of each sub-band in which the terminal is capable of receiving the system information, where the frequency channel number of each sub-band is represented by using a frequency spacing of the sub-band relative to an anchor sub-band. After receiving the fourth indication information, the terminal may determine the sub-band in which the system information can be received. If the terminal supports a sub-band aggregation capability, the terminal may receive the system message in a discrete sub-band aggregation manner in the sub-band in which the system information can be received, to reduce a system message obtaining delay to some extent.

The network device may send the fourth indication information by using an RRC message. The terminal receives the fourth indication information by using the RRC message. Alternatively, the network device may send the fourth indication information by using a layer 1 message, and the terminal receives the fourth indication information by using the layer 1 message.

According to a second aspect, a communications apparatus is provided. The communications apparatus may be applied to a network device. The communications apparatus applied to the network device includes units or means (means) for performing steps that are performed by the network device in the first aspect. The units or means may be implemented by hardware, or by hardware executing corresponding software. The hardware or the software includes one or more modules corresponding to the foregoing functions. The module may be software and/or hardware.

In a possible design, the communications apparatus applied to the network device includes a processing unit and a sending unit, and may further include a receiving unit. Functions of the receiving unit, the processing unit, and the sending unit may correspond to the method steps. Details are not described herein.

According to a third aspect, a communications apparatus is provided. The communications apparatus may be applied to a terminal. The communications apparatus applied to the terminal includes units or means (means) for performing steps that are performed by the terminal in the first aspect. The units or means may be implemented by hardware, or by hardware executing corresponding software. The hardware or the software includes one or more modules corresponding to the foregoing functions. The module may be software and/or hardware.

In a possible design, the communications apparatus applied to the terminal includes a processing unit and a receiving unit, and may further include a sending unit. Functions of the processing unit, the receiving unit, and the sending unit may correspond to the method steps. Details are not described herein.

According to a fourth aspect, a network device is provided. The network device includes a processor and a transceiver, and may further include a memory. The memory is configured to be coupled to the processor, and stores a program instruction and data that are necessary for the network device. The processor, the transceiver, and the memory are connected. The memory is configured to store an instruction. The processor is configured to execute the instruction stored in the memory, and control the transceiver to send and receive signals, to complete functions performed by the network device according to any one of the first aspect or the possible designs of the first aspect.

According to a fifth aspect, a terminal is provided. The terminal includes a processor and a receiver, and may further include a transmitter and a memory. The memory is configured to be coupled to the processor, and stores a program instruction and data that are necessary for the terminal. The processor executes the instruction stored in the memory, to perform functions performed by the terminal according to any one of the first aspect or the possible designs of the first aspect.

In a possible design, the terminal may further include an antenna.

According to a sixth aspect, a communications system is provided. The system includes the network device according to the fourth aspect and one or more terminals according to the fifth aspect.

According to a seventh aspect, a computer storage medium is provided. The computer-readable storage medium stores a computer instruction. When the instruction is run on a computer, any method related to the terminal or the network device according to any one of the first aspect or the possible designs of the first aspect may be completed.

According to an eighth aspect, a computer program product is provided. The computer program product includes a computer program, and the computer program is used to perform any method related to the terminal or the network device according to any one of the first aspect or the possible designs of the first aspect.

In the embodiments of this application, the network device sends, to the terminal, the first indication information used to indicate the frequency channel numbers of all the discrete sub-bands of the cell and the second indication information used to indicate the sub-band available to the terminal in all the discrete sub-bands, so that the terminal can determine the available sub-band, and can transmit data in the available sub-band. In this way, discrete sub-bands are aggregated to support high-rate data transmission.

BRIEF DESCRIPTION OF DRAWINGS

FIG. 4 is a schematic diagram of a hopping-based data transmission process according to an embodiment of this application;

DESCRIPTION OF EMBODIMENTS

Figure 1:
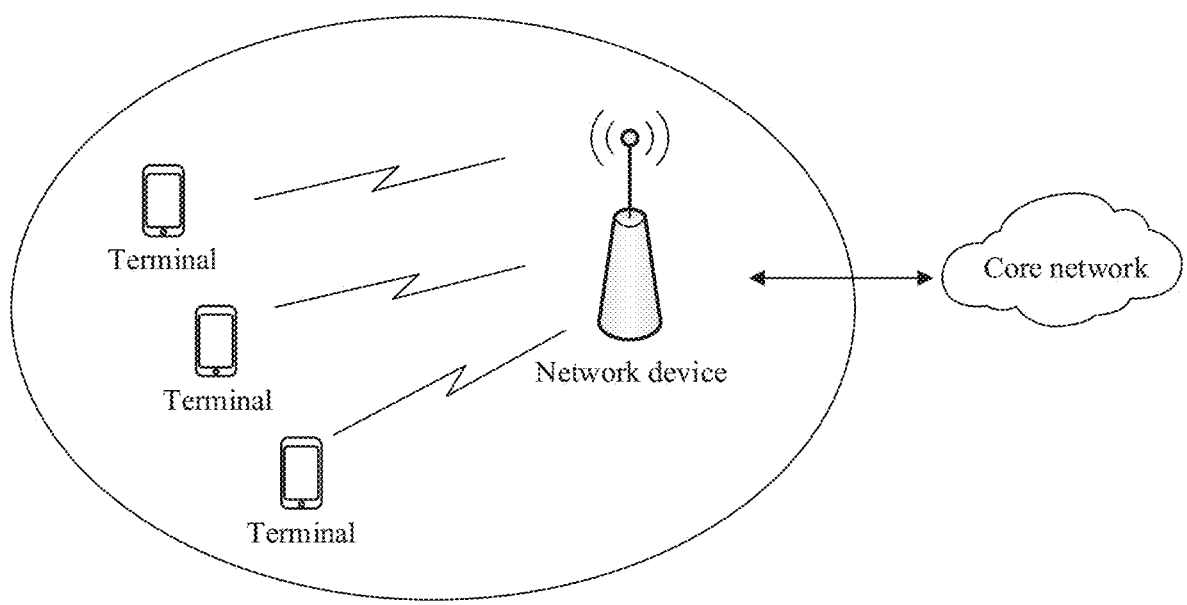
FIG. 1 is an architectural diagram of a system to which an embodiment of this application is applied.

The following describes technical solutions of embodiments in this application with reference to accompanying drawings.

Some terms in this application are first described, to help a person skilled in the art have a better understanding.

(1) A terminal is also referred to as user equipment (User Equipment, UE), a mobile station (mobile station, MS), a mobile terminal (mobile terminal, MT), a transmission reception point (transmission and receiver point, TRP, or transmission point, TP), or the like, and is a device that provides voice and/or data connectivity for a user, such as a handheld device or an in-vehicle device that has a wireless connection function. Currently, for example, some terminals are a mobile phone (mobile phone), a tablet computer, a notebook computer, a handheld computer, a mobile internet device (mobile internet device, MID), a wearable terminal, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), and a wireless terminal in a smart home (smart home).

(2) Network device, also referred to as a radio access network (radio access network, RAN) device (or a node), is a device that connects a terminal to a wireless network, and may also be referred to as a base station. Currently, for example, some RAN nodes are a next generation NodeB (gNB), a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (base band unit, BBU), and a wireless fidelity (wireless fidelity, Wi-Fi) access point (access point, AP). In addition, in a network structure, the RAN may include a centralized unit (centralized unit, CU) node and a distributed unit (distributed unit, DU) node. In this structure, a protocol layer of an eNB in a long term evolution (long term evolution, LTE) system is split, where some functions of the protocol layer are controlled by a CU in a centralized manner, remaining or all functions of the protocol layer are distributed in DUs, and the CU controls the DUs in a centralized manner.

(3) "A plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

(4) Interaction refers to a process in which information is transferred between two interactive parties, and the information transferred herein may be the same or may be different. For example, if the two interactive parties are a base station 1 and a base station 2, the base station 1 may request information from the base station 2, and the base station 2 provides the base station 1 with the information requested by the base station 1. Certainly, the base station 1 and the base station 2 may alternatively request information from each other, and the information requested herein may be the same or may be different.

(5) Terms "network" and "system" are often used interchangeably, but a person skilled in the art can understand meanings thereof. The terms "information (information)", "signal (signal)", "message (message)", and "channel (channel)" may be interchangeably used sometimes. It should be noted that expressed meanings are consistent when differences are not emphasized. The terms "of (of)", "corresponding (corresponding, relevant)", and "corresponding (corresponding)" may be interchangeably used sometimes. It should be noted that expressed meanings of the terms are consistent when differences are not emphasized.

(6) A sub-band may also be referred to as a subcarrier. A sub-band that is inconsecutive in frequency is referred to as a discrete sub-band. In a discrete narrowband communications system, one cell includes a plurality of discrete sub-bands, and each discrete sub-band has a fixed sub-band bandwidth.

(7) An anchor sub-band (Anchor sub-band) is a sub-band mainly used to transmit a primary synchronization signal (primary synchronization, PSS)/secondary synchronization signal (secondary synchronization, SSS) and a physical broadcast channel (physical broadcasting channel, PBCH). It may be understood that, signals transmitted in the anchor sub-band are not limited to the foregoing PSS, SSS, and PBCH, and may further include other signals.

(8) A start sub-band is the first sub-band. The first sub-band is usually a sub-band with a smallest frequency channel number in a frequency band, or may be a predefined sub-band with a fixed frequency channel number. For example, a start sub-band of a cell may be the first sub-band of all discrete sub-bands of the cell, or may be a predefined sub-band with a fixed frequency channel number. A start sub-band available to a terminal may be the first sub-band in available discrete sub-bands.

(9) A frequency channel number of a sub-band may also be referred to as a center frequency of the sub-band.

(10) A frequency band (Band) is corresponding to a frequency range. If a frequency of a sub-band falls within the frequency range, the frequency band may be referred to as a frequency band to which the sub-band belongs.

Figure 2:
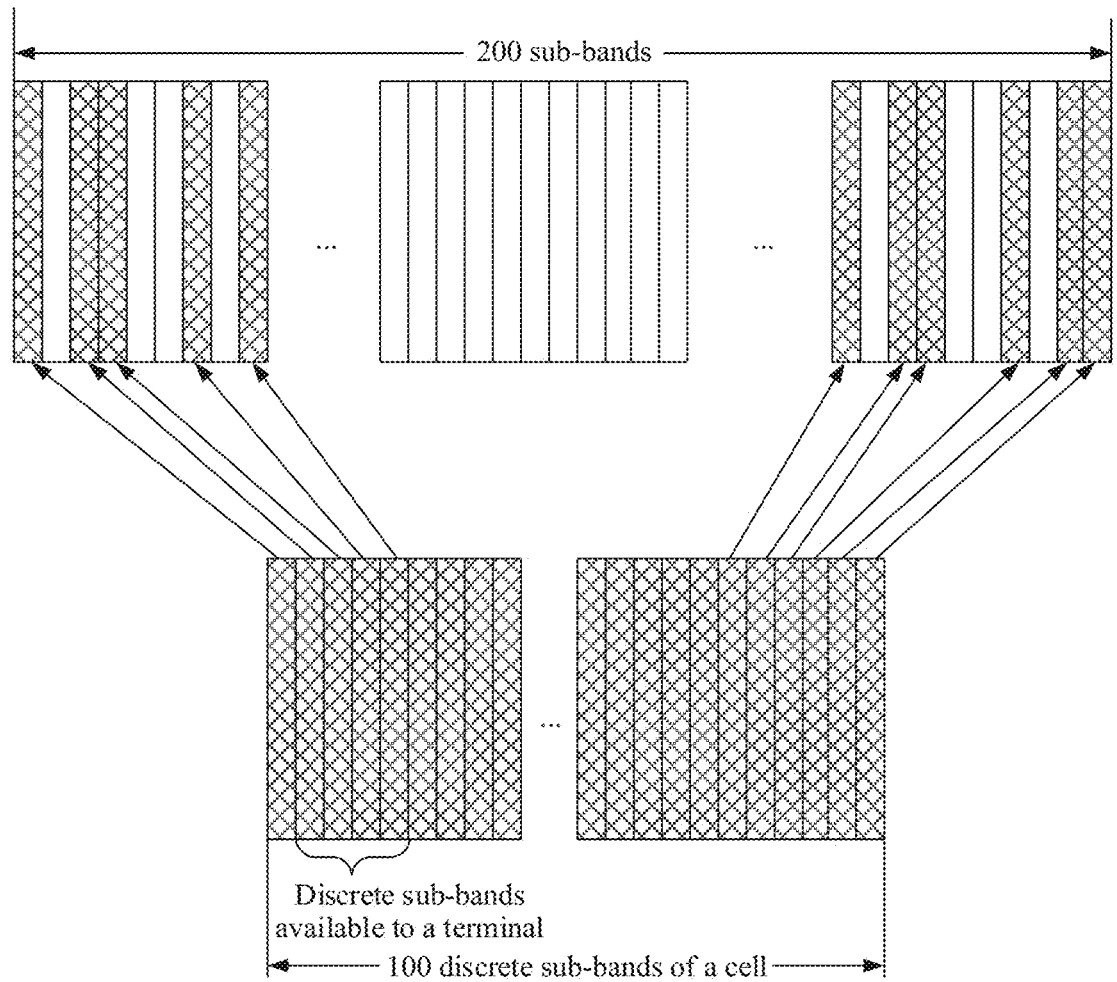
FIG. 2 is a schematic diagram of all discrete sub-bands of a cell to which an embodiment of this application is applicable and discrete sub-bands available to a terminal.

A communication method provided in the embodiments of this application may be applied to a discrete narrowband communications system. In the discrete narrowband communications system, a terminal accesses a network by using a network device such as a base station, and the network device and a core network complete backhaul and forward transmission of data, as shown in FIG. 1. In the discrete narrowband communications system shown in FIG. 1, the terminal communicates and interacts with the network device over an air interface. When communicating and interacting with the network device over the air interface, the terminal usually transmits data by using one discrete sub-band. For ease of description, in the following embodiments, a communication manner in which the terminal transmits data by using one discrete sub-band may be referred to as single sub-band data transmission. The single sub-band communication manner is described by using FIG. 2 as an example. For example, as shown in FIG. 2, in a frequency band including 200 sub-bands, 100 discrete sub-bands belong to available sub-bands of a current serving cell of a terminal. For a terminal, a network device may allocate a specified quantity of discrete sub-bands in 100 discrete sub-bands of a current serving cell of the terminal, and use the specified quantity of discrete sub-bands as discrete sub-bands available to the terminal, so that the terminal uses theses discrete sub-bands to transmit data with the network device.

Currently, in the discrete narrowband communications system, the terminal usually performs single sub-band data transmission by using a single discrete sub-band allocated by the network device. However, because a bandwidth of the single discrete sub-band is limited, a data transmission rate that can be supported is also limited. Consequently, high-rate data transmission cannot be well supported.

In view of this, an embodiment of this application provides a communication method. In the method, a terminal may transmit data in a specified quantity of discrete sub-bands allocated by a network device. In this way, discrete sub-bands are aggregated to support high-rate data transmission.

Figure 3:
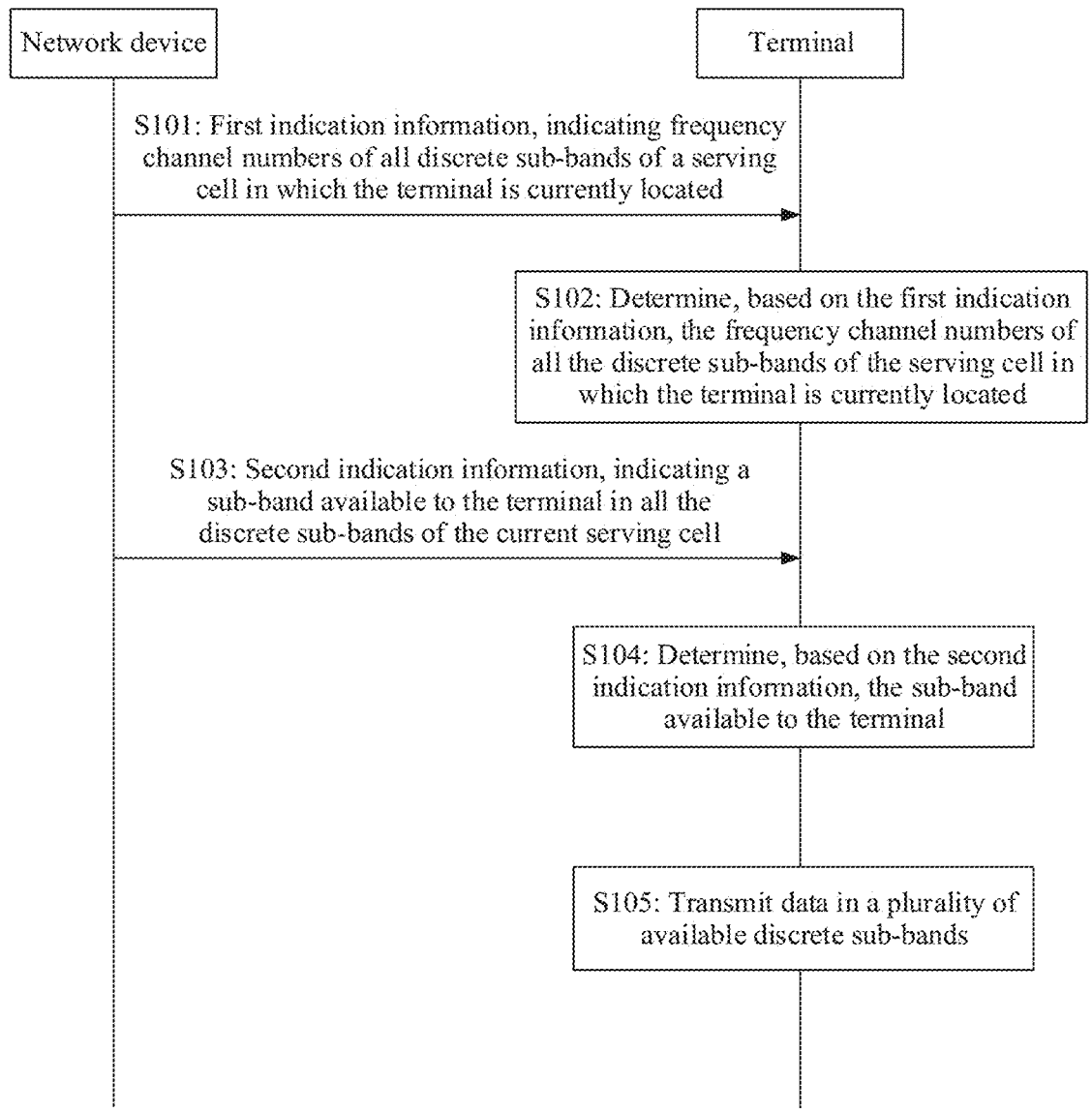
FIG. 3 is an implementation flowchart of a communication method according to an embodiment of this application.

FIG. 3 is an implementation flowchart of a communication method according to an embodiment of this application. Referring to FIG. 3, the method includes the following steps.

S101: A network device sends first indication information to a terminal, where the first indication information is used to indicate frequency channel numbers of all discrete sub-bands of a serving cell in which the terminal is currently located.

In this embodiment of this application, the terminal may obtain a synchronization signal by using an anchor sub-band in a single-sub-band data transmission communication manner, and obtain a master information block (Master Information Block, MIB) and a system information block (System Information Block. SIB) that are carried in a PBCH, so that the network device can send system information to the terminal.

In a possible implementation, the network device may send the first indication information to the terminal by using the system information.

S102: The terminal receives the first indication information sent by the network device, and may determine, based on the first indication information, the frequency channel numbers of all the discrete sub-bands of the serving cell in which the terminal is currently located.

The terminal may obtain the first indication information by using the system information sent by the network device.

S103: The network device sends second indication information to the terminal, where the second indication information is used to indicate a sub-band available to the terminal in all the discrete sub-bands of the current serving cell.

In this embodiment of this application, the network device may allocate an available discrete sub-band to the terminal in all the discrete sub-bands of the current serving cell of the terminal, and send the second indication information to the terminal, to indicate the discrete sub-band available to the terminal in all the discrete sub-bands of the current serving cell.

In this embodiment of this application, the network device may allocate the available discrete sub-band to the terminal based on at least one of a load status of the current serving cell of the terminal, a current service requirement of the terminal, and the like.

Further, in this embodiment of this application, the terminal and the network device may access the random access channel (Random Access Channel, RACH) in the single-sub-band communication manner, and establish a radio resource control (Radio Resource Control, RRC) connection.

In a possible implementation, the terminal may send sub-band aggregation specification capability information to the network device in an RRC connection establishment process, where the sub-band aggregation specification capability information is used to indicate a quantity of sub-bands of which aggregation is supported by the terminal. The network device receives the sub-band aggregation specification capability information sent by the terminal, and may allocate an available discrete sub-band to the terminal based on a sub-band aggregation specification capability supported by the terminal.

After the RRC connection is established, the network device may send the second indication information by using dedicated signaling, for example, may send the second indication information to the terminal by using downlink control information (downlink control information, DCI) that is sent to the terminal.

Alternatively, the network device may send the second indication information by using dedicated signaling in an RRC connection establishment process or after an RRC connection is established, for example, may send the second indication information to the terminal by using an RRC connection establishment message or an RRC connection reconfiguration message that is sent to the terminal.

S104: The terminal receives the second indication information sent by the network device, and determines, based on the second indication information, the sub-band available to the terminal.

The terminal may receive, by using the dedicated signaling sent by the network device, the second indication information sent by the network device.

In this embodiment of this application, the network device sends, to the terminal, the first indication information used to indicate the frequency channel numbers of all the discrete sub-bands of the cell and the second indication information used to indicate the sub-band available to the terminal in all the discrete sub-bands, so that the terminal can determine the available sub-band, and can transmit data in the available sub-band. In this way, discrete sub-bands are aggregated to support high-rate data transmission.

S105: The terminal transmits data in a plurality of available discrete sub-bands.

For ease of description, in this embodiment of this application, a communication manner in which the terminal transmits data in a plurality of discrete sub-bands may be referred to as a discrete sub-band aggregation communication manner.

In this embodiment of this application, the following describes, with reference to actual application, the discrete sub-band aggregation communication manner mentioned in the foregoing embodiment.

First, a specific implementation process in which the first indication information indicates the frequency channel numbers of all the discrete sub-bands of the current serving cell of the terminal is described in this embodiment of this application.

In a possible implementation, the first indication information may include a frequency channel number of a start sub-band of the current serving cell of the terminal, a bitmap (bitmap) representing whether each sub-band in a frequency band belongs to the cell, and a frequency spacing between sub-bands in the frequency band, where the frequency band is a frequency band to which all the discrete sub-bands of the current serving cell belong. The terminal may determine the frequency channel numbers of all the discrete sub-bands of the current serving cell of the terminal based on information included in the first indication information.

In this embodiment of this application, the start sub-band of the current serving cell of the terminal may be the first discrete sub-band in all the discrete sub-bands of the cell, or may be the first sub-band in the frequency band to which all the discrete sub-bands of the cell belong. For example, the first sub-band in a frequency band including 200 sub-bands shown in FIG. 2 may be used as a start sub-band, and a frequency channel number of the start sub-band may be understood as the first absolute radio frequency (absolute radio frequency). For example, in this embodiment of this application, the frequency channel number of the start sub-band may be denoted as f1.

In this embodiment of this application, one bit may be used to indicate whether a sub-band belongs to the discrete sub-bands of the cell. For example, when a value of the bit is 1, it may indicate that the sub-band belongs to the discrete sub-bands of the cell, and when the value of the bit is 0, it may indicate that the sub-band does not belong to the discrete sub-bands of the cell. Certainly, values may alternatively have opposite meanings. For example, when a value of the bit is 0, it indicates that the sub-band belongs to the discrete sub-bands of the cell, and when the value of the bit is 1, it indicates that the sub-band does not belong to the discrete sub-band of the cell. If each sub-band in the frequency band to which all the discrete sub-bands of the current serving cell belong is represented by a bit, it may indicate whether each sub-band in the frequency band to which all the discrete sub-bands of the current serving cell belong belongs to the discrete sub-bands of the current serving cell of the terminal. For example, as shown in FIG. 2, the frequency band to which all the discrete sub-bands of the current serving cell belong includes 200 sub-bands, and 200 bits may be used to indicate whether each sub-band belongs to the discrete sub-bands of the current serving cell of the terminal. For example, the bitmap of the discrete sub-bands of the current serving cell may be represented as 101100101 . . . 1011001011 (a 200-bit bitmap), where a total of 100 bits are 1, and therefore, sub-bands corresponding to the 100 bits being 1 are all the discrete sub-bands of the current serving cell.

In this embodiment of this application, to indicate the frequency channel numbers of all the discrete sub-bands of the cell, the first indication information may further include the frequency spacing between the sub-bands in the frequency band to which all the discrete sub-bands of the current serving cell of the terminal belong. The frequency spacing is an absolute value of a difference between center frequencies of two sub-bands, for example, may be 25 kHz.

It is assumed that a bandwidth of the frequency band to which all the discrete sub-bands of the current serving cell of the terminal belong is 5M. In the foregoing indication manner, the first indication information may include 32 bits used to indicate the frequency channel number of the start sub-band, 200 bits used to indicate whether each sub-band in the frequency band belongs to the cell, and bits used to indicate 25 kHz.

In a possible implementation of this embodiment of this application, the frequency spacing between the sub-bands in the frequency band to which all the discrete sub-bands of the current serving cell of the terminal belong may be included in the first indication information sent by the network device to the terminal, and may be sent to the terminal in an explicit manner. In another possible implementation, the terminal may alternatively determine the frequency spacing in an implicit manner. For example, a fixed frequency spacing may be set in a predefined manner, and does not need to be sent by the network device to the terminal. For example, a default value of the frequency spacing may be preset for the terminal in a predefined manner. For example, the default value is set to 25 kHz. After obtaining, from the network device, the frequency channel number of the start sub-band of the current serving cell of the terminal and the bitmap representing whether each sub-band in the frequency band, to which all the discrete sub-bands of the current serving cell belong, belongs to the cell, the terminal may determine the frequency channel numbers of all the discrete sub-bands that belong to the current serving cell.

The network device sends the foregoing first indication information to the terminal. After receiving the first indication information, the terminal may determine the frequency channel numbers of all the discrete sub-bands of the current serving cell of the terminal based on information included in the first indication information, for example, may determine the frequency channel numbers of all the discrete sub-bands of the current serving cell of the terminal in a manner shown in Table 1.

TABLE 1

| Sequence number of a sub-band of a cell | Frequency channel number of a physical sub-band |
| --- | --- |
| 1 | f1 |
| 2 | f1 + 2 * 25 kHz |
| 3 | f1 + 3 * 25 kHz |
| . . . | |
| N | f1 + k * 25 kHz, where k is an $N^{th}$ bit being 1 and starting from the start sub-band |

In another possible implementation, in addition to including the frequency channel number of the start sub-band and the bitmap representing whether each sub-band in the frequency band belongs to the cell that are mentioned above, or including the frequency channel number of the start sub-band, the bitmap representing whether each sub-band in the frequency band belongs to the cell, and the frequency spacing between the sub-bands in the frequency band that are mentioned above, the first indication information sent by the network device to the terminal may further include a quantity of all the discrete sub-bands of the current serving cell of the terminal.

In this embodiment of this application, the first indication information includes the quantity of all the discrete sub-bands of the current serving cell of the terminal, so that after determining that the quantity of all the discrete sub-bands that belong to the current serving cell and that are in the frequency band has been indicated, the network device may not indicate a remaining sub-band that does not belong to the current serving cell of the terminal and that is in the frequency band. For example, a frequency band with a bandwidth of 5M corresponds to 200 sub-bands with a frequency spacing of 25 kHz, and the 200 sub-bands include 100 sub-bands which are all the discrete sub-bands of the current serving cell of the terminal. In this case, if the network device completes, in a specified sub-band in the 200 sub-bands, indication of the 100 sub-bands that are all the discrete sub-bands of the current serving cell of the terminal, indication using a bit of 0 in bits that have not been used for indication in the bitmap may be omitted, thereby reducing indication overheads.

Further, in still another possible implementation, in this embodiment of this application, if the frequency band to which all the discrete sub-bands of the current serving cell of the terminal belong includes M consecutive sub-bands that do not belong to the current serving cell of the terminal, where M is a positive integer, sub-bands that are at two ends of the M sub-bands and that are in the frequency band to which all the discrete sub-bands of the current serving cell of the terminal belong may form two different sub-band clusters, and the M consecutive sub-bands between the sub-band clusters do not belong to the cell. Sub-bands in the frequency band to which all the discrete sub-bands of the current serving cell of the terminal belong form at least one sub-band cluster in the foregoing manner. The first indication information includes at least one piece of sub-band cluster indication information, and the sub-band cluster indication information includes start sub-band information of a sub-band cluster, a bitmap representing whether each sub-band in the sub-band cluster belongs to the cell, and a frequency spacing of sub-bands in the sub-band cluster. Optionally, frequency fading characteristics of the sub-bands in a sub-band cluster are approximate.

In this embodiment of this application, when the sub-band cluster includes M consecutive sub-bands that do not belong to the current serving cell of the terminal, the sub-band cluster indication information may be used for indication, to further reduce indication overheads of the M consecutive sub-bands that are in the bitmap and that do not belong to the current serving cell. For example, if the cluster indication information is not used, required indication information is: f1, 101100101 . . . 1011001011 (a 200-bit bitmap), and if the cluster indication information is used, required indication information is: f1, 101100101; and f3, 1011001011.

Then, a specific implementation process in which the second indication information indicates the sub-band available to the terminal in all the discrete sub-bands of the current serving cell is described in this embodiment of this application.

In a possible implementation, the second indication information may include a sequence number of a start sub-band available to the terminal in all the discrete sub-bands of the current serving cell and a quantity of sub-bands available to the terminal.

In this embodiment of this application, the network device may allocate a specified quantity of consecutive logical sub-bands to the terminal in all the discrete sub-bands of the current serving cell of the terminal, and use the specified quantity of consecutive logical sub-bands as discrete sub-bands available to the terminal. If all the discrete sub-bands of the serving cell of the terminal are numbered in sequence, the consecutive logical sub-bands are a specified quantity of sub-bands with consecutive numbers in all the discrete sub-bands of the cell.

If the second indication information includes the sequence number of the start sub-band available to the terminal in all the discrete sub-bands of the current serving cell and the quantity of sub-bands available to the terminal, the terminal may determine, based on the second indication information, the discrete sub-band available to the terminal. As shown in Table 2, the sequence number of the start sub-band of the terminal in all the discrete sub-bands of the current serving cell is 8, and the quantity of sub-bands available to the terminal is N, where N is a positive integer. In this case, a sub-band whose sequence number is N and that is available to the terminal corresponds to a sub-band whose sequence number is 8+N−1 in the discrete sub-bands of the current serving cell.

TABLE 2

| Sequence number of a sub-band available to a terminal | Sequence number of a discrete sub-band of a serving cell |
| --- | --- |
| 1 | 8 |
| 2 | 9 |
| . . . | |
| N | 8 + N − 1 |

In this embodiment of this application, the network device allocates the consecutive logical sub-bands to the terminal, and a quantity of bits that need to be used to indicate the sequence number that is of the start sub-band available to the terminal in all the discrete sub-bands of the current serving cell and that is included in the second indication information sent by the network device to the terminal may be determined based on the quantity of all the discrete sub-bands of the current serving cell. For example, if the quantity of all the discrete sub-bands of the current serving cell is 100, the start sub-band available to the terminal may be indicated by using seven bits.

In another possible implementation, the second indication information includes a bitmap representing each corresponding sub-band available to the terminal in all the discrete sub-bands of the current serving cell of the terminal.

In this embodiment of this application, one bit may be allocated to each of all the discrete sub-bands of the current serving cell of the terminal, and a value of the bit is used to indicate whether each sub-band corresponding sub-band in all the discrete sub-bands of the current serving cell of the terminal is available to the terminal. For example, when the value of the bit is 1, it may indicate that the terminal can use the sub-band. When the value of the bit is 0, it may indicate that the terminal cannot use the sub-band. Certainly, values may alternatively have opposite meanings. For example, when the value of the bit is 0, it indicates that the terminal can use the sub-band. When the value of the bit is 1, it may indicate that the terminal cannot use the sub-band. For example, if the quantity of all the discrete sub-bands of the current serving cell shown in FIG. 2 is 100, 100 bits may be used to indicate a bitmap representing whether each sub-band in all the discrete sub-bands of the current serving cell of the terminal is available to the terminal. For example, the bitmap representing whether each sub-band in all the discrete sub-bands of the current serving cell of the terminal can be used by the terminal may be represented as 0011110 . . . (a 100-bit bitmap), where a sub-band corresponding to a bit whose value is 1 in the 100-bit bitmap is a sub-band available to the terminal.

In a possible implementation of this application, if all the discrete sub-bands of the current serving cell of the terminal are discrete sub-bands available to the terminal, the network device may not send the foregoing second indication information to the terminal. When the terminal does not receive the second indication information sent by the network device, the terminal may consider by default that all the discrete sub-bands of the current serving cell of the terminal are discrete sub-bands available to the terminal.

In this embodiment of this application, after determining the available discrete sub-bands in the foregoing manners, the terminal may perform communication in a discrete sub-band aggregation communication manner.

Specifically, in this embodiment of this application, when performing communication in the discrete sub-band aggregation communication manner, the terminal may select a sub-band from sub-bands that are available to the terminal and that are determined based on the second indication information, to receive physical downlink control channel (Physical Downlink Control Channel, PDCCH) information, and transmit data in the determined available sub-bands.

If the discrete sub-bands available to the terminal are all the discrete sub-bands of the current serving cell of the terminal, the terminal may receive a PDCCH in a sub-band (a sub-band in which the terminal camps) in which the PDCCH is previously received. Specifically, the sub-band in which the terminal camps may be an anchor sub-band of the cell, or may be a sub-band in which the terminal listens to a paging message.

Further, in this embodiment of this application, a specified quantity of sub-bands may be selected from the sub-bands available to the terminal as sub-bands that can be used for a physical downlink shared channel (Physical Downlink Shared Channel, PDSCH), so that the PDSCH may also be indicated to the terminal in the discrete sub-band aggregation communication manner, where the sub-bands that can be used for the PDSCH may be indicated by using the PDCCH.

A specific implementation process of indicating, by the network device, the sub-bands that can be used for the PDSCH in this embodiment of this application is similar to the foregoing implementation process of indicating, by using the second indication information, the discrete sub-band available to the terminal. A difference lies only in that: The indicated discrete sub-band available to the terminal is configured based on all the discrete sub-bands of the current serving cell of the terminal, and the sub-bands that can be used for the PDSCH are configured based on all discrete sub-bands available to the terminal. Therefore, similarities are not described herein again.

Further, in this embodiment of this application, in a specific implementation process of indicating, by the network device, the sub-bands that can be used for the PDSCH, a start sub-band may be predefined, to avoid indicating the start sub-band, thereby reducing indication signaling overheads. For example, it is considered by default that the start sub-band of the PDSCH is a start sub-band of the discrete sub-bands available to the terminal, and only a quantity of the sub-bands that can be used for the PDSCH needs to be indicated.

Considering that a single sub-band has a smaller bandwidth and is more prone to deep fading compared with a broadband with a larger bandwidth. In this embodiment of this application, to alleviate deep fading, when performing communication in the discrete sub-band aggregation communication manner, the terminal may use a frequency hopping mechanism, to be specific, the terminal always sends and receives data in a sub-band with a corresponding logical sub-band number. Cyclic shift is performed between a logical sub-band number and an actual physical sub-band number based on a subframe number or a slot number. Therefore, data transmission may be distributed on a plurality of sub-bands in frequency, thereby obtaining a frequency diversity gain. The physical sub-band number is a sequence number of each of all the discrete sub-bands of the current serving cell of the terminal. A mapping relationship between a logical sub-band number and a physical sub-band may be predefined. The network device always indicates a logical sub-band of the terminal, and the logical sub-band corresponds to a physical sub-band during actual data sending and receiving. For example, in FIG. 4, the terminal always sends and receives data in logical sub-bands whose logical sub-band numbers are 0, 1, 2, and 3, which correspond to physical sub-bands 0, 4, 8, and 12 in a slot 0 and correspond to physical sub-bands 2, 6, 10, and 14 in a slot 1.

In this embodiment of this application, the network device sends, to the terminal, the first indication information used to indicate the frequency channel numbers of all the discrete sub-bands of the cell and the second indication information used to indicate the sub-band available to the terminal in all the discrete sub-bands, so that the terminal can determine the available sub-band, and can transmit data in the available sub-band. In this way, discrete sub-bands are aggregated to support high-rate data transmission.

Figure 5:
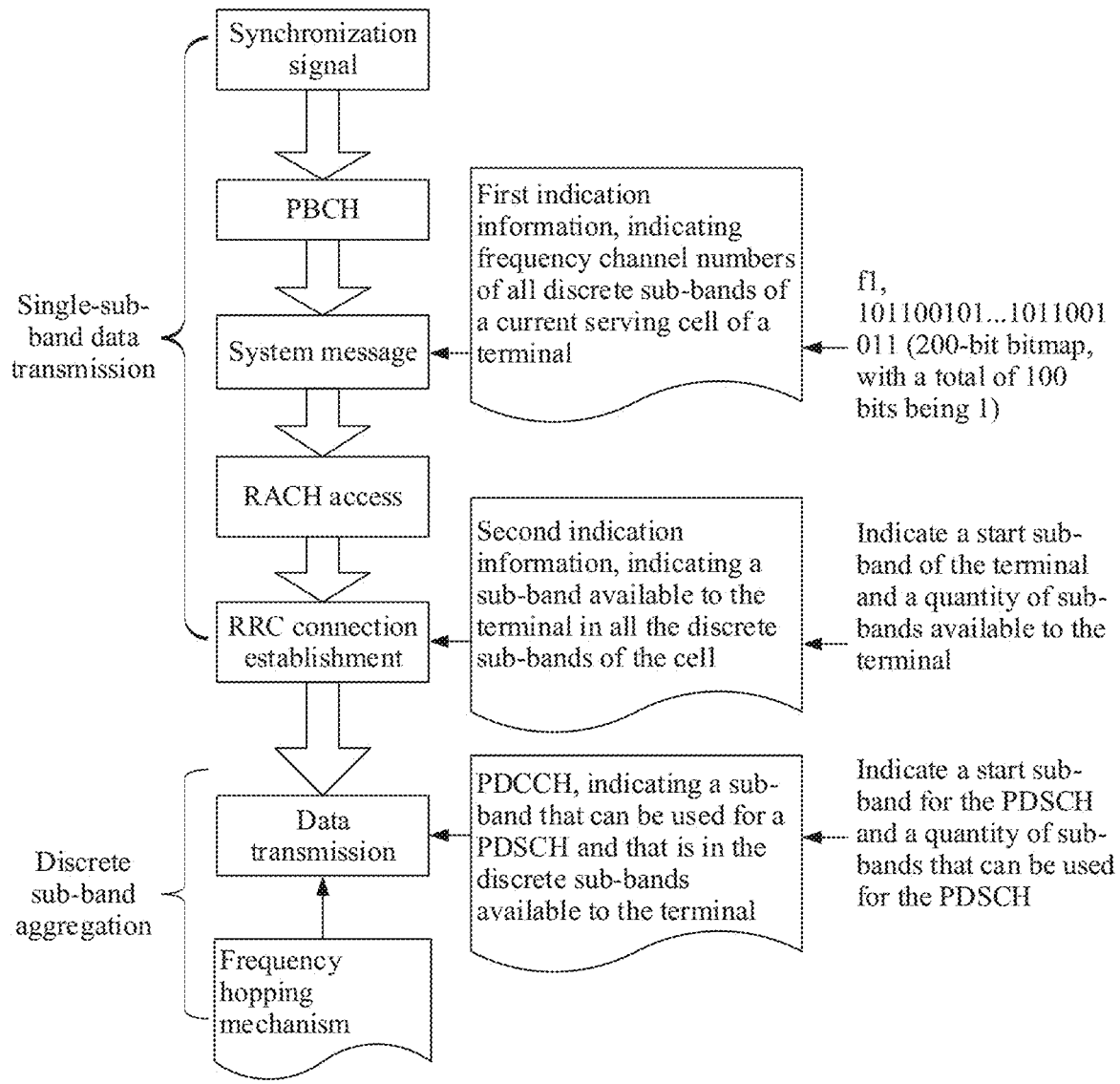
FIG. 5 is an implementation flowchart of another communication method according to an embodiment of this application.

FIG. 5 is a schematic diagram of a possible communication process in which communication is performed by using the foregoing communication method according to an embodiment of this application. As shown in FIG. 5, a terminal obtains a synchronization signal, a PBCH, and system information in a single sub-band data transmission communication manner, accesses the PBCH, and establishes an RRC connection. In a single sub-band data transmission communication process, a network device may send first indication information to the terminal by using the system information, to indicate frequency channel numbers of all discrete sub-bands of a current serving cell of the terminal. The terminal obtains the first indication information by using the system information, and determines the frequency channel numbers of all the discrete sub-bands of the current serving cell of the terminal. After establishing the RRC connection or in an RRC connection establishment process, the terminal may obtain second indication information by using dedicated signaling sent by the network device, and determine a sub-band available to the terminal in all the discrete sub-bands of the current serving cell of the terminal. After determining the available sub-band, the terminal may transmit data in the available sub-band in a discrete sub-band aggregation communication manner. In the data transmission process, the network device may indicate, by using a PDCCH, information about a sub-band that can be used for a PDSCH, or may transmit data by using a frequency hopping mechanism.

For a manner of indicating all the discrete sub-bands of the cell, a manner of indicating the sub-band available to the terminal, and a manner of indicating the sub-band that can be used for the PDSCH, refer to related descriptions in the foregoing embodiment. Details are not described herein again.

Further, in this embodiment of this application, the network device may further send third indication information to the terminal, where the third indication information is used to indicate at least one piece of anchor sub-band information, so that the terminal can select an anchor sub-band with optimal performance, to obtain initial access information. A specific implementation process is shown in FIG. 6.

Figure 6:
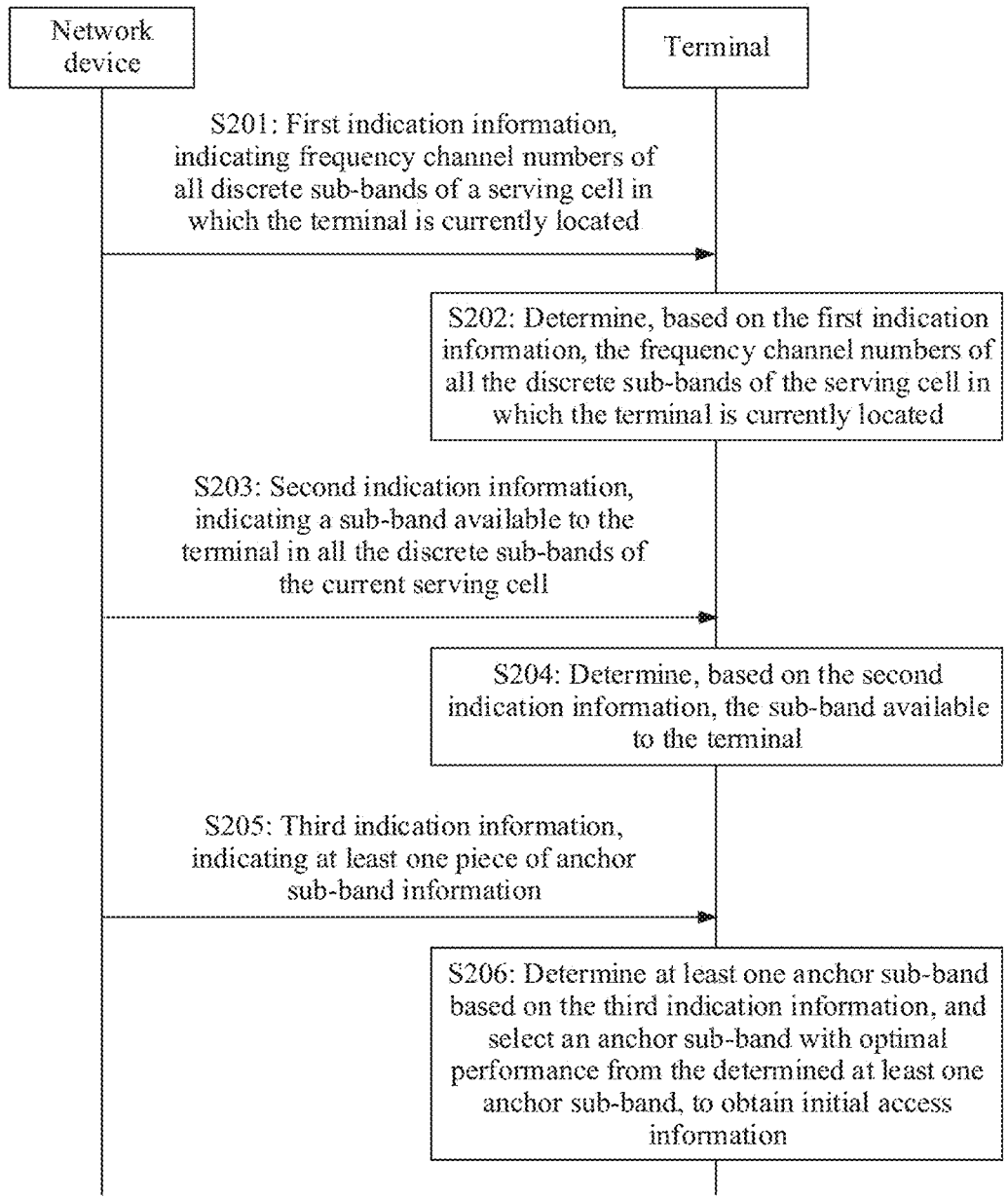
FIG. 6 is an implementation flowchart of still another communication method according to an embodiment of this application.

Implementation steps S201, S202, S203, and S204 in FIG. 6 are the same as implementation steps S101, S102, S103, and S104 in FIG. 3, and details are not described herein again.

S205: The network device sends third indication information to the terminal, where the third indication information is used to indicate at least one piece of anchor sub-band information.

In this embodiment of this application, the network device may configure a plurality of anchor sub-bands for the terminal, so that the terminal can select an anchor sub-band with optimal performance from the plurality of anchor sub-bands, to obtain initial access information, thereby alleviating deep fading in a discrete narrowband communications system.

Generally, in a cluster bandwidth design, frequency fading statuses of sub-bands in a sub-band cluster may be the same or similar. To avoid deep fading in a sub-band cluster, in this embodiment of this application, if sub-bands in a frequency band to which all the discrete sub-bands of the current serving cell of the terminal belong include a plurality of sub-band clusters, the network device may configure one anchor sub-band in each sub-band cluster for the terminal, and information transmitted in the anchor sub-bands may be the same or may be different.

In this embodiment of this application, the network device may send, to the terminal, the third indication information used to indicate the anchor sub-band information, so that the terminal can determine the plurality of anchor sub-bands. The anchor sub-band information may include at least one of a frequency channel number of an anchor sub-band, a sequence number of the anchor sub-band in all the discrete sub-bands of the current serving cell of the terminal, and a spacing of the frequency channel number of the anchor sub-band relative to a frequency channel number of a start sub-band of the current serving cell of the terminal.

In this embodiment of this application, the network device may send the third indication information to the terminal by using system information.

S206: The terminal receives the third indication information sent by the network device, determines at least one anchor sub-band based on the third indication information, and selects an anchor sub-band with optimal performance from the determined at least one anchor sub-band, to obtain initial access information such as a synchronization signal, a MIB, and a SIB.

In this embodiment of this application, the terminal may obtain, by using the system information, the third indication information sent by the network device.

In this embodiment of this application, to enable the terminal to obtain the anchor sub-band with optimal performance as soon as possible, the network device may indicate a frequency channel number of the anchor sub-band to the terminal. The network device may indicate the frequency channel number of the anchor sub-band to the terminal in different indication manners depending on whether information content transmitted by the network device in the plurality of anchor sub-bands configured for the terminal in the current serving cell of the terminal is the same. If the information content transmitted by the network device in the plurality of anchor sub-bands configured for the terminal in the current serving cell of the terminal is the same, the network device may indicate frequency channel numbers of all anchor sub-bands to the terminal. If the information content transmitted by the network device in the plurality of anchor sub-bands configured for the terminal in the current serving cell of the terminal is different, the network device may indicate, to the terminal, frequency channel numbers of other anchor sub-bands different from a currently used anchor sub-band.

Specifically, when the network device indicates the frequency channel numbers of all the anchor sub-bands to the terminal, the network device may indicate the specific frequency channel numbers of all the anchor sub-bands, or may indicate sequence numbers of all the anchor sub-bands in all the discrete sub-bands of the current serving cell of the terminal, or may indicate a sequence number of a start anchor sub-band in all the anchor sub-bands and frequency spacings of other anchor sub-bands relative to the start anchor sub-band.

When indicating, to the terminal, the frequency channel numbers of the other anchor sub-bands different from the currently used anchor sub-band, the network device may indicate the specific frequency channel numbers of the other anchor sub-bands different from the currently used anchor sub-band, or may indicate sequence numbers of the other anchor sub-bands that are different from the currently used anchor sub-band and that are in all the discrete sub-bands of the current serving cell of the terminal, or may indicate frequency spacings of the other anchor sub-bands that are different from the currently used anchor sub-band and that are relative to the currently used anchor sub-band.

In this embodiment of this application, the network device may send, to the terminal, the third indication information used to indicate the anchor sub-band information, so that the terminal can determine the plurality of anchor sub-bands, and select the anchor sub-band with optimal performance from the plurality of anchor sub-bands, to obtain initial access information.

Further, in this embodiment of this application, in a process in which the terminal transmits data in the discrete sub-band aggregation communication manner, if cell reselection occurs, the terminal first needs to obtain system information of a target cell, and then can further complete access of a reselected cell. In this embodiment of this application, the system message may be sent in a discrete sub-band aggregation manner. For example, sub-band aggregation may be performed on anchor sub-bands for sending the system message.

In this embodiment of this application, to send the system message in the discrete sub-band aggregation manner, the network device may further send fourth indication information to the terminal. The fourth indication information is used to indicate information about a sub-band in which the terminal receives the system message. After receiving the fourth indication information, the terminal may determine the sub-band in which the system information can be received. If the terminal supports a sub-band aggregation capability, the terminal may receive the system message in a discrete sub-band aggregation manner in the sub-band in which the system information can be received, to reduce a system message obtaining delay to some extent.

In this embodiment of this application, an implementation solution in which the network device sends, to the terminal, the fourth indication information used to indicate the sub-band in which the terminal receives the system information may be implemented based on the method shown in FIG. 3, or may be implemented based on the method shown in FIG. 6. This is not limited in this embodiment of this application. The following uses implementation based on the method shown in FIG. 6 as an example for description. A specific implementation process is shown in FIG. 7.

Figure 7:
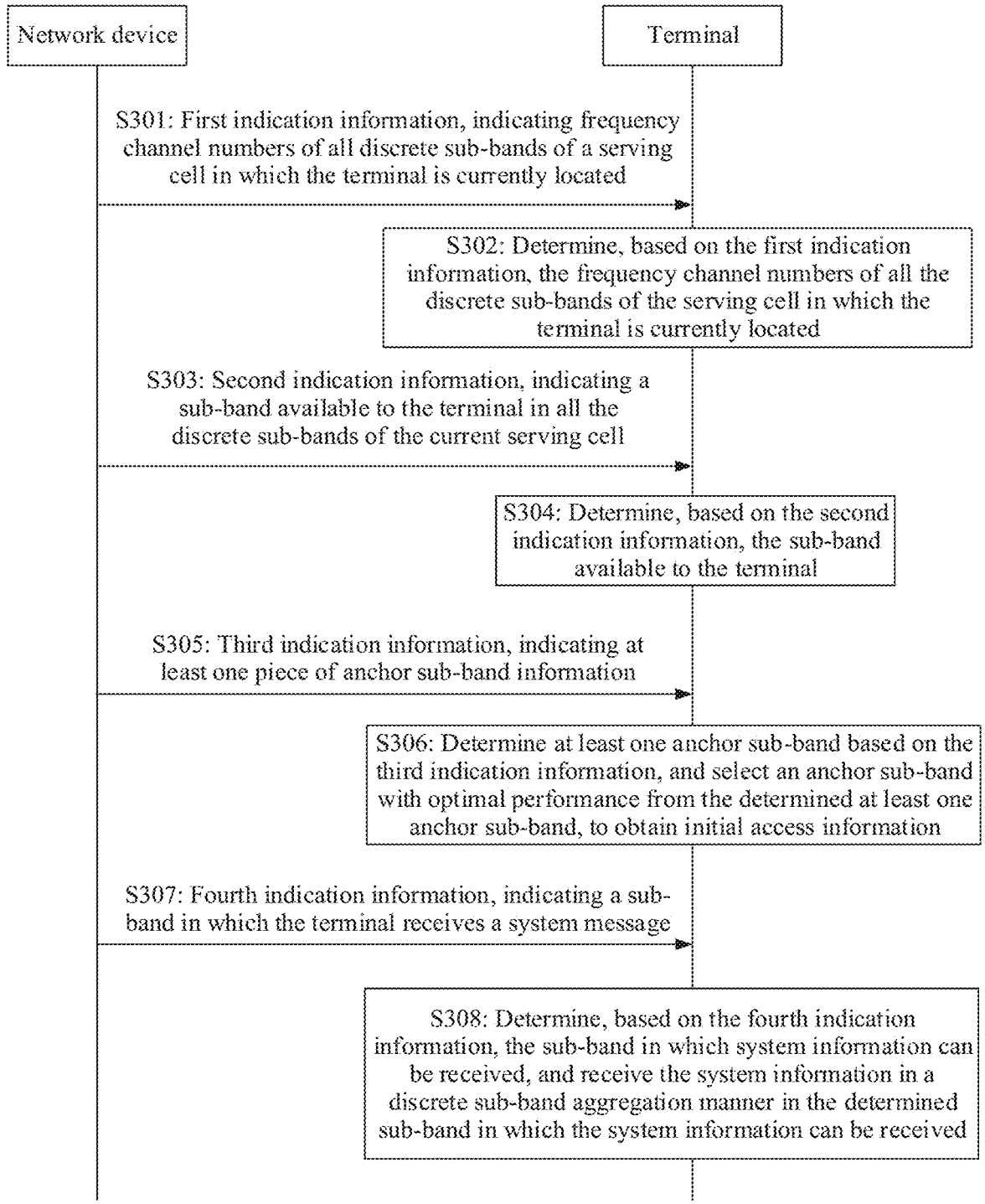
FIG. 7 is an implementation flowchart of still another communication method according to an embodiment of this application.

Implementation steps S301, S302, S303, S304, S305, and S306 in FIG. 7 are the same as implementation steps S201, S202, S203, S204, S205, and S206 in FIG. 6, and details are not described herein again.

S307: The network device sends fourth indication information to the terminal, where the fourth indication information is used to indicate the information about a sub-band in which the terminal receives a system message.

The fourth indication information may be sent by using an RRC message (for example, a MIB or a SIB 1), or the fourth indication information may be sent by using a layer 1 message (for example, DCI).

Specifically, the fourth indication information may carry one of the following information, to indicate the sub-band in which the terminal receives the system message:

Manner 1: The fourth indication information includes a frequency channel number of a start sub-band in which the terminal receives the system message, and a bitmap representing whether the terminal can receive the system information.

Manner 2: The fourth indication information includes a frequency channel number of each sub-band in which the terminal is capable of receiving the system information, where the frequency channel number of each sub-band is represented by using a frequency spacing of the sub-band relative to an anchor sub-band.

S308: The terminal receives the fourth indication information sent by the network device, determines, based on information about the sub-band that is for receiving the system message and that is indicated in the fourth indication information, the sub-band in which the system information can be received, and receives the system information in the discrete sub-band aggregation manner in the determined sub-band in which the system information can be received.

In this embodiment of this application, if the network device indicates, in Manner 1, the information about the sub-band in which the terminal receives the system information, the terminal may obtain frequency channel numbers of all sub-bands that are 1 in a bitmap, and receive the system message on these frequency channel numbers.

If the network device indicates, in Manner 2, the information about the sub-band in which the terminal receives the system information, the terminal may obtain frequency channel numbers of all sub-bands, and receive the system message on these frequency channel numbers.

In this embodiment of this application, the terminal receives the system message in the discrete sub-band aggregation manner in the sub-band in which the system information can be received, thereby reducing a system message obtaining delay to some extent.

It should be noted that, in the specification, claims, and accompanying drawings of this application, the terms "first", "second", and the like are intended to distinguish between similar objects but do not necessarily describe a specific order or sequence. For example, the first indication information, the second indication information, the third indication information, and the fourth indication information in the embodiments of this application are merely for ease of description and distinguishing between different indication information, and are not intended to limit the indication information. It should be understood that the data termed in such a way are interchangeable in proper circumstances so that the embodiments of the present invention described herein can be implemented in other orders than the order illustrated or described herein.

It should be further noted that, in the embodiments of this application, a specific execution sequence of steps in the foregoing methods and steps shown in the accompanying drawings is not limited. For example, in FIG. 7, instead of first sending the first indication information and the second indication information and then sending the third indication information and the fourth indication information in the manners shown in FIG. 7, the network device may first send the third indication information and the fourth indication information, and then send the first indication information and the second indication information.

The foregoing mainly describes the solutions provided in the embodiments of this application from a perspective of interaction between the terminal and the network device. It may be understood that to implement the foregoing functions, the terminal and the network device include corresponding hardware structures and/or software modules for performing the functions. In combination with examples of units (components or devices) and algorithm steps described in the embodiments disclosed in this application, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, functional unit (component or device) division may be performed on the terminal and the network device based on the foregoing method examples. For example, each functional unit (component or device) may be divided corresponding to each function, or two or more functions may be integrated into one processing unit (component or device). The integrated unit (component or device) may be implemented in a form of hardware, or may be implemented in a form of a software functional unit (component or device). It should be noted that the unit (component or device) division in the embodiments of this application is an example, and is merely logical function division. There may be another division manner during actual implementation.

Figure 8:
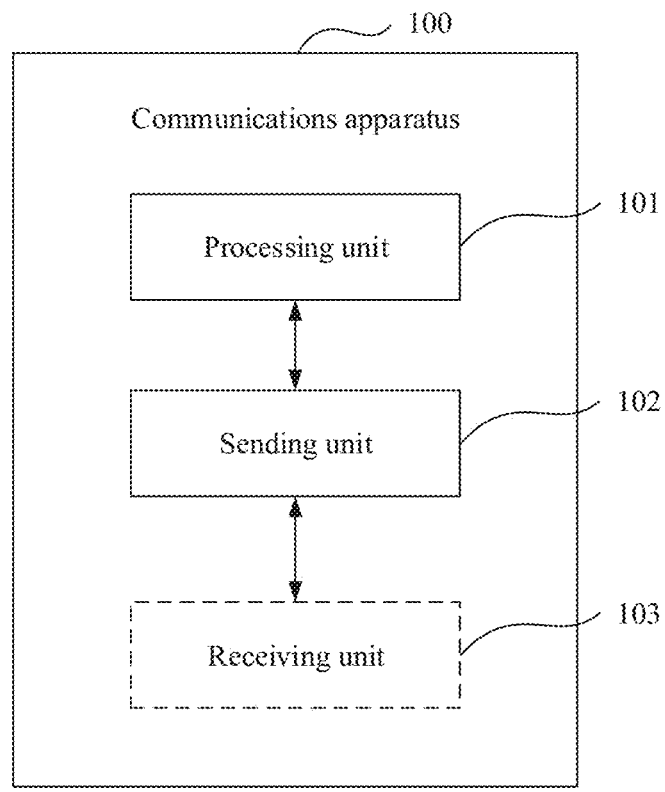
FIG. 8 is a schematic structural diagram of a communications apparatus according to an embodiment of this application.

When the integrated unit (component or device) is used, FIG. 8 is a schematic structural diagram of a communications apparatus 100 according to an embodiment of this application. The communications apparatus 100 in FIG. 8 may be applied to a network device in a discrete narrowband communications system. Referring to FIG. 8, the communications apparatus 100 applied to the network device may include a processing unit 101 and a sending unit 102. The sending unit 102 sends first indication information and second indication information to a terminal under control of the processing unit 101. The first indication information is used to indicate frequency channel numbers of all discrete sub-bands of a serving cell in which the terminal is currently located. The second indication information is used to indicate a sub-band available to the terminal in all the discrete sub-bands of the serving cell.

The first indication information carries the following information, to indicate the frequency channel numbers of all the discrete sub-bands of the serving cell in which the terminal is currently located: a frequency channel number of a start sub-band in all the discrete sub-bands of the serving cell in which the terminal is currently located, a bitmap representing whether each sub-band in a frequency band belongs to the serving cell in which the terminal is currently located, and a frequency spacing between sub-bands in the frequency band. The frequency band is a frequency band to which all the discrete sub-bands of the serving cell in which the terminal is currently located belong.

Further, the first indication information may further include a quantity of all the discrete sub-bands of the serving cell in which the terminal is currently located.

The second indication information may carry one of the following information, to indicate the sub-band available to the terminal in all the discrete sub-bands of the serving cell:

The second indication information includes a sequence number of a start sub-band available to the terminal in all the discrete sub-bands of the serving cell in which the terminal is currently located, and a quantity of sub-bands available to the terminal. Alternatively, the second indication information includes a bitmap representing each corresponding sub-band available to the terminal in all the discrete sub-bands of the serving cell in which the terminal is currently located.

In a possible implementation, the sending unit 102 is further configured to: send third indication information to the terminal, where the third indication information is used to indicate at least one piece of anchor sub-band information. The anchor sub-band information includes at least one of the following information: a frequency channel number of an anchor sub-band, a sequence number of the anchor sub-band in all the discrete sub-bands of the serving cell in which the terminal is currently located, and a spacing of the frequency channel number of the anchor sub-band relative to the frequency channel number of the start sub-band.

In another possible implementation, the communications apparatus 100 applied to the network device further includes a receiving unit 103, and the receiving unit 103 is configured to: before the sending unit 102 sends the second indication information to the terminal, receive sub-band aggregation specification capability information sent by the terminal, where the sub-band aggregation specification capability information is used to indicate a quantity of sub-bands of which aggregation is supported by the terminal.

In another possible implementation, the sending unit 102 is further configured to: send fourth indication information to the terminal, where the fourth indication information is used to indicate a sub-band in which the terminal receives a system message.

The fourth indication information carries one of the following information, to indicate the sub-band in which the terminal receives the system message: the frequency channel number of the start sub-band and a bitmap representing whether the terminal is capable of receiving the system information; or a frequency channel number of each sub-band in which the terminal is capable of receiving the system information, where the frequency channel number of each sub-band is represented by using a frequency spacing of the sub-band relative to an anchor sub-band.

When hardware is used for implementation, in this embodiment of this application, the processing unit 101 may be a processor or a controller, the sending unit 102 and the receiving unit 103 may be a communications interface, a transceiver, a transceiver circuit, or the like. The communications interface is a collective term, and may include one or more interfaces.

Figure 9:
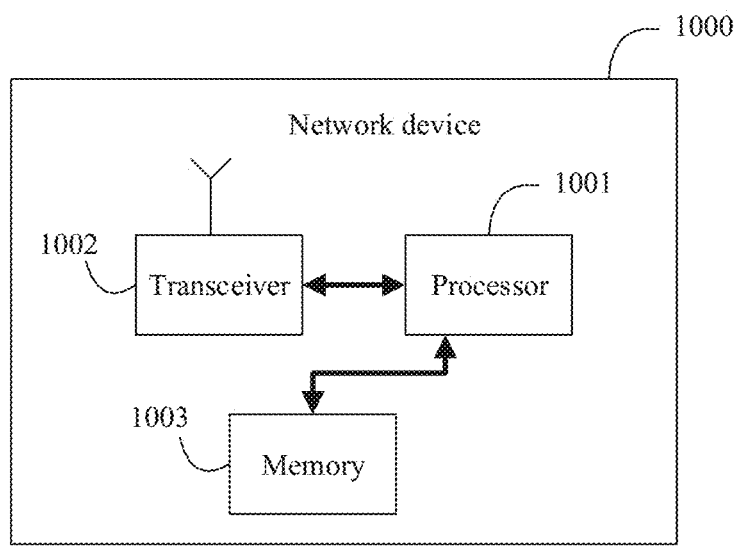
FIG. 9 is a schematic structural diagram of a network device according to an embodiment of this application.

When the processing unit 101 is a processor, and the sending unit 102 and the receiving unit 103 are a transceiver, the communications apparatus 100 in this embodiment of this application may be a communications apparatus shown in FIG. 9, and the communications apparatus shown in FIG. 9 may be a network device, for example, a base station.

FIG. 9 is a schematic structural diagram of a network device 1000 according to an embodiment of this application, in other words, is another possible schematic structural diagram of the communications apparatus 100. As shown in FIG. 9, the network device 1000 includes a processor 1001 and a transceiver 1002. The processor 1001 may be alternatively a controller. The processor 1001 is configured to support the network device in performing related functions in FIG. 3, FIG. 6, and FIG. 7. The transceiver 1002 is configured to support functions of sending and receiving messages by the network device. The network device may further include a memory 1003. The memory 1003 is configured to be coupled to the processor 1001, and stores a program instruction and data that are necessary for the network device. The processor 1001, the transceiver 1002, and the memory 1003 are connected. The memory 1003 is configured to store an instruction. The processor 1001 is configured to execute the instruction stored in the memory 1003, to control the transceiver 1002 to send and receive signals, to complete the steps in which network device performs corresponding functions in the foregoing methods.

In the embodiments of this application, for concepts, explanations, detailed descriptions, and other steps that are related to the communications apparatus 100 and the network device 1000 and related to the technical solutions provided in the embodiments of this application, refer to descriptions about the content in the foregoing method embodiments or other embodiments. Details are not described herein.

Figure 10:
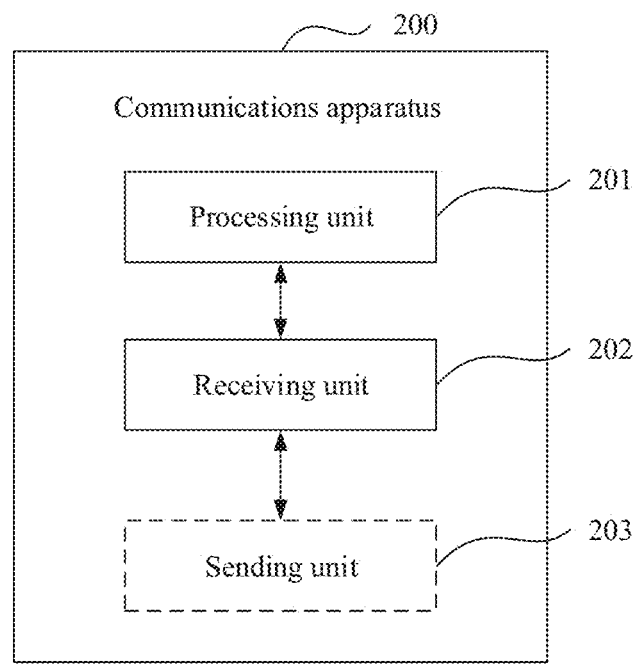
FIG. 10 is a schematic structural diagram of another communications apparatus according to an embodiment of this application.

When the integrated unit (component or device) is used, FIG. 10 is a schematic structural diagram of a communications apparatus 200 according to an embodiment of this application. The communications apparatus 200 shown in FIG. 10 may be applied to a terminal in a discrete narrow-band communications system. Referring to FIG. 10, the communications apparatus 200 applied to the terminal may include a processing unit 201 and a receiving unit 202. The receiving unit 202 receives, under control of the processing unit 201, first indication information and second indication information that are sent by a network device. The first indication information is used to indicate frequency channel numbers of all discrete sub-bands of a serving cell in which the terminal is currently located. The second indication information is used to indicate a sub-band available to the terminal in all the discrete sub-bands of the serving cell in which the terminal is currently located.

The first indication information carries a frequency channel number of a start sub-band in all the discrete sub-bands of the serving cell in which the terminal is currently located, a bitmap representing whether each sub-band in a frequency band belongs to the serving cell in which the terminal is currently located, and a frequency spacing between sub-bands in the frequency band, to indicate the frequency channel numbers of all the discrete sub-bands of the serving cell in which the terminal is currently located. The frequency band is a frequency band to which all the discrete sub-bands of the serving cell in which the terminal is currently located belong.

Further, the first indication information further includes a quantity of all the discrete sub-bands of the serving cell in which the terminal is currently located.

The second indication information carries one of the following information, to indicate the sub-band available to the terminal in all the discrete sub-bands of the serving cell: a sequence number of a start sub-band available to the terminal in all the discrete sub-bands of the serving cell in which the terminal is currently located, and a quantity of sub-bands available to the terminal. Alternatively, the second indication information includes a bitmap representing each corresponding sub-band available to the terminal in all the discrete sub-bands of the serving cell in which the terminal is currently located.

In a possible implementation, the receiving unit 202 is further configured to: receive third indication information sent by the network device, where the third indication information is used to indicate at least one piece of anchor sub-band information. The anchor sub-band information includes at least one of the following information: a frequency channel number of an anchor sub-band, a sequence number of the anchor sub-band in all the discrete sub-bands of the serving cell in which the terminal is currently located, and a spacing of the frequency channel number of the anchor sub-band relative to the frequency channel number of the start sub-band.

In another possible implementation, the communications apparatus 200 further includes a sending unit 203, and the sending unit 203 is configured to: before the receiving unit 202 receives the second indication information sent by the network device, send sub-band aggregation specification capability information to the network device, where the sub-band aggregation specification capability information is used to indicate a quantity of sub-bands of which aggregation is supported by the terminal.

In still another possible implementation, the receiving unit 202 is further configured to: receive fourth indication information sent by the network device, where the fourth indication information is used to indicate a sub-band in which the terminal receives a system message. The fourth indication information carries one of the following information, to indicate the sub-band in which the terminal receives the system message: the frequency channel number of the start sub-band and a bitmap representing whether the terminal is capable of receiving the system information; or a frequency channel number of each sub-band in which the terminal is capable of receiving the system information, where the frequency channel number of each sub-band is represented by using a frequency spacing of the sub-band relative to an anchor sub-band.

When hardware is used for implementation, in this embodiment of this application, the processing unit 201 may be a processor or a controller, the receiving unit 202 may be a communications interface, a receiver, a receive circuit, or the like, and the sending unit 203 may be a communications interface, a transmitter, a transmit circuit, or the like. The communications interface is a collective term, and may include one or more interfaces.

Figure 11:
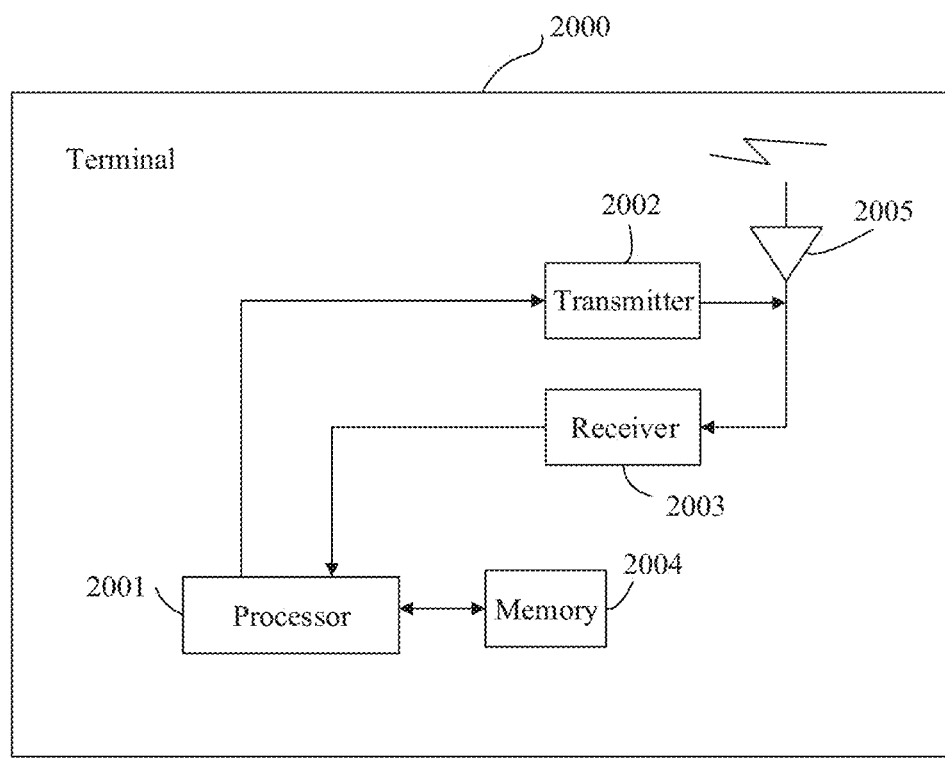
FIG. 11 is a schematic structural diagram of a terminal according to an embodiment of this application.

When the processing unit 201 is a processor, the receiving unit 202 is a receiver, and the sending unit 203 is a transmitter, the communications apparatus 200 in this embodiment of this application may be a communications apparatus shown in FIG. 11, and the communications apparatus shown in FIG. 11 may be a terminal.

FIG. 11 is a schematic structural diagram of a terminal 2000 according to an embodiment of this application, in other words, is another possible schematic structural diagram of the communications apparatus 200. As shown in FIG. 11, the terminal 2000 includes a processor 2001, a transmitter 2002, and a receiver 2003. The processor 2001 may be alternatively a controller. The processor 2001 is configured to support the terminal in performing related functions in FIG. 3, FIG. 6, and FIG. 7. The transmitter 2002 and the receiver 2003 are configured to support functions of sending and receiving messages between the terminal 2000 and a network device. The terminal 2000 may further include a memory 2004. The memory 2004 is configured to be coupled to the processor 2001, and stores a program instruction and data that are necessary for the terminal 2000. The processor 2001, the transmitter 2002, the receiver 2003, and the memory 2004 are connected. The memory 2004 is configured to store an instruction. The processor 2001 is configured to execute the instruction stored in the memory 2004, to control the transmitter 2002 and the receiver 2003 to send and receive signals, to complete steps in which the terminal performs corresponding functions in the foregoing methods.

Further, the terminal 2000 may further include an antenna 2005.

In the embodiments of this application, for concepts, explanations, detailed descriptions, and other steps that are related to the communications apparatus 200 and the terminal 2000 and related to the technical solutions provided in the embodiments of this application, refer to descriptions about the content in the foregoing method embodiments or other embodiments. Details are not described herein again.

It may be understood that, in the accompanying drawings of the embodiments of this application, only simplified designs of the terminal and the network device are shown. In an actual application, the terminal and the network device are not limited to the foregoing structures, and may further include, for example, an antenna array, a duplexer, and a baseband processing part.

The duplexer of the network device is configured to enable the antenna array to send and receive signals. The transmitter is configured to implement conversion between a radio frequency signal and a baseband signal. The transmitter may usually include a power amplifier, a digital-to-analog converter, and a frequency converter, and the receiver may usually include a low-noise amplifier, an analog-to-digital converter, and a frequency converter. The receiver and the transmitter may be collectively referred to as a transceiver sometimes. The baseband processing part is configured to: process a to-be-sent or received signal, such as layer mapping, precoding, modulation/demodulation, and encoding/decoding, and separately process a physical control channel, a physical data channel, a physical broadcast channel, a reference signal, and the like. For another example, the terminal may further include a display device, an input/output interface, and the like.

The terminal may have a single antenna, or a plurality of antennas (namely, an antenna array). The duplexer of the terminal is configured to enable the antenna array to send and receive signals. The transmitter is configured to implement conversion between a radio frequency signal and a baseband signal. The transmitter may usually include a power amplifier, a digital-to-analog converter, and a frequency converter, and the receiver may usually include a low-noise amplifier, an analog-to-digital converter, and a frequency converter. The baseband processing part is configured to: process a to-be-sent or received signal, such as layer mapping, precoding, modulation/demodulation, and encoding/decoding, and separately process a physical control channel, a physical data channel, a physical broadcast channel, a reference signal, and the like. In an example, the terminal may alternatively include a control part. The control part is configured to: request a physical uplink resource, calculate channel state information (channel state information, CSI) corresponding to a downlink channel, determine whether a downlink data packet is successfully received, and so on.

It should be noted that the processor in the embodiments of this application may be a central processing unit (central processing unit, CPU), a general-purpose processor, a digital signal processor (digital signal processing, DSP), an application-specific integrated circuit (application-specific integrated circuit, ASIC), a field programmable gate array (field programmable gate array, FPGA), or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The memory may be integrated into the processor, or may be separately disposed with the processor.

In an implementation, it may be considered that functions of the receiver and the transmitter are implemented by using a transceiver circuit or a dedicated transceiver chip, and that the processor may be implemented by using a dedicated processing chip, a processing circuit, a processor, or a general-purpose chip.

In another implementation, program code that is used to implement functions of the processor, the receiver, and the transmitter is stored in the memory. A general-purpose processor implements the functions of the processor, the receiver, and the transmitter by executing the code in the memory.

According to the methods provided in the embodiments of this application, an embodiment of this application further provides a communications system, including the foregoing network device and one or more terminals.

An embodiment of this application further provides a computer storage medium. The computer storage medium stores some instructions. When the instructions are executed, the communication method in the foregoing method embodiments may be completed.

An embodiment of this application further provides a computer program product, including a computer program. The computer program is used to perform the communication methods in the foregoing method embodiments.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A communication method, applied to a discrete narrowband communications system, comprising:
    sending, by a network device, first indication information to a terminal, wherein the first indication information comprises:
        a frequency channel number of a start sub-band in all discrete sub-bands of a serving cell in which the terminal is currently located;
        a bitmap representing whether each sub-band in a frequency band belongs to the serving cell; and
        a frequency spacing between sub-bands in the frequency band, wherein the frequency band is a frequency band to which all the discrete sub-bands of the serving cell belong; and
    sending, by the network device, second indication information to the terminal, wherein the second indication information is used to indicate a specified quantity of consecutive logical sub-bands to the terminal in all the discrete sub-bands of the serving cell, wherein the specified quantity of consecutive logical sub-bands are allocated by the network device based on at least one of a load status of the serving cell of the terminal or a current service requirement of the terminal, wherein the specified quantity of consecutive logical sub-bands are a specified quantity of sub-bands with consecutive numbers in all the discrete sub-bands of the serving cell, wherein cyclic shift is performed between a logical sub-band number and an actual physical sub-band number of the specified quantity of consecutive logical sub-bands based on a subframe number or a slot number, and wherein the actual physical sub-band number is a sequence number of each of all the discrete sub-bands of the serving cell.

2. The method according to claim 1, wherein the first indication information further comprises a quantity of all the discrete sub-bands of the serving cell.

3. The method according to claim 1, wherein the method further comprises:
    sending, by the network device, third indication information to the terminal, wherein the third indication information is used to indicate at least one piece of anchor sub-band information, and wherein the anchor sub-band information comprises at least one of the following information:
    a frequency channel number of an anchor sub-band;
    a sequence number of the anchor sub-band in all the discrete sub-bands of the serving cell; or
    a spacing of the frequency channel number of the anchor sub-band relative to the frequency channel number of the start sub-band.

4. The method according to claim 1, wherein before the sending, by the network device, second indication information to the terminal, the method further comprises:
receiving, by the network device, sub-band aggregation specification capability information sent by the terminal, wherein the sub-band aggregation specification capability information is used to indicate a quantity of sub-bands of which aggregation is supported by the terminal.

5. The method according to claim 1, wherein the method further comprises:
sending fourth indication information to the terminal, wherein the fourth indication information is used to indicate a sub-band in which the terminal receives a system message; and
wherein the fourth indication information carries one of the following information, to indicate the sub-band in which the terminal receives the system message:
the frequency channel number of the start sub-band and a bitmap representing that the terminal is capable of receiving system information; or
a frequency channel number of each sub-band in which the terminal is capable of receiving the system information, wherein the frequency channel number of each sub-band is represented by using a frequency spacing of the sub-band relative to an anchor sub-band.

6. A communication method, applied to a discrete narrowband communications system, comprising:
receiving, by a terminal, first indication information sent by a network device, wherein the first indication information comprises:
a frequency channel number of a start sub-band in all discrete sub-bands of a serving cell in which the terminal is currently located;
a bitmap representing whether each sub-band in a frequency band belongs to the serving cell; and
a frequency spacing between sub-bands in the frequency band, wherein the frequency band is a frequency band to which all the discrete sub-bands of the serving cell belong; and
receiving, by the terminal, second indication information sent by the network device, wherein the second indication information is used to indicate a specified quantity of consecutive logical sub-bands to the terminal in all the discrete sub-bands of the serving cell, wherein the specified quantity of consecutive logical sub-bands are allocated by the network device based on at least one of a load status of the serving cell of the terminal or a current service requirement of the terminal, wherein the specified quantity of consecutive logical sub-bands are a specified quantity of sub-bands with consecutive numbers in all the discrete sub-bands of the serving cell, wherein cyclic shift is performed between a logical sub-band number and an actual physical sub-band number of the specified quantity of consecutive logical sub-bands based on a subframe number or a slot number, and wherein the actual physical sub-band number is a sequence number of each of all the discrete sub-bands of the serving cell.

7. The method according to claim 6, wherein the first indication information further comprises a quantity of all the discrete sub-bands of the serving cell.

8. The method according to claim 6, wherein the method further comprises:
receiving, by the terminal, third indication information sent by the network device, wherein the third indication information is used to indicate at least one piece of anchor sub-band information, and wherein the anchor sub-band information comprises at least one of the following information:
a frequency of an anchor sub-band;
a sequence number of the anchor sub-band in all the discrete sub-bands of the serving cell; or
a spacing of the frequency channel number of the anchor sub-band relative to the frequency channel number of the start sub-band.

9. The method according to claim 6, wherein before the receiving, by the terminal, second indication information sent by the network device, the method further comprises:
sending, by the terminal, sub-band aggregation specification capability information to the network device, wherein the sub-band aggregation specification capability information is used to indicate a quantity of sub-bands of which aggregation is supported by the terminal.

10. The method according to claim 6, wherein the method further comprises:
receiving, by the terminal, fourth indication information sent by the network device, wherein the fourth indication information is used to indicate a sub-band in which the terminal receives a system message; and
wherein the fourth indication information carries one of the following information, to indicate the sub-band in which the terminal receives the system message:
the frequency channel number of the start sub-band and a bitmap representing that the terminal is capable of receiving system information; or
a frequency channel number of each sub-band in which the terminal is capable of receiving the system information, wherein the frequency channel number of each sub-band is represented by using a frequency spacing of the sub-band relative to an anchor sub-band.

11. A communications apparatus, applied to a network device in a discrete narrowband communications system, and comprising at least one processor and a transceiver, wherein:
the transceiver sends first indication information and second indication information to a terminal under control of the at least one processor,
wherein the first indication information comprises:
a frequency channel number of a start sub-band in all discrete sub-bands of a serving cell in which the terminal is currently located;
a bitmap representing whether each sub-band in a frequency band belongs to the serving cell; and
a frequency spacing between sub-bands in the frequency band, wherein the frequency band is a frequency band to which all the discrete sub-bands of the serving cell belong; and
wherein the second indication information is used to indicate a specified quantity of consecutive logical sub-bands to the terminal in all the discrete sub-bands of the serving cell, wherein the specified quantity of consecutive logical sub-bands are allocated by the network device based on at least one of a load status of the serving cell of the terminal or a current service requirement of the terminal, wherein the specified quantity of consecutive logical sub-bands are a specified quantity of sub-bands with consecutive numbers in all the discrete sub-bands of the serving cell, wherein cyclic shift is performed between a logical sub-band number and an actual physical sub-band number of the specified quantity of consecutive logical sub-bands based on a subframe number or a slot number, and wherein the actual physical sub-band number is a sequence number of each of all the discrete sub-bands of the serving cell.

12. The apparatus according to claim 11, wherein the first indication information further comprises a quantity of all the discrete sub-bands of the serving cell.

13. The apparatus according to claim 11, wherein the transceiver is further configured to:
send third indication information to the terminal, wherein the third indication information is used to indicate at least one piece of anchor sub-band information, and wherein the anchor sub-band information comprises at least one of the following information:
a frequency of an anchor sub-band;
a sequence number of the anchor sub-band in all the discrete sub-bands of the serving cell; or
a spacing of the frequency channel number of the anchor sub-band relative to the frequency channel number of the start sub-band.

14. The apparatus according to claim 11, wherein the transceiver is further configured to:
before sending the second indication information to the terminal, receive sub-band aggregation specification capability information sent by the terminal, wherein the sub-band aggregation specification capability information is used to indicate a quantity of sub-bands of which aggregation is supported by the terminal.

15. The apparatus according to claim 11, wherein the transceiver is further configured to:
send fourth indication information to the terminal, wherein the fourth indication information is used to indicate a sub-band in which the terminal receives a system message; and
wherein the fourth indication information carries one of the following information, to indicate the sub-band in which the terminal receives the system message:
the frequency channel number of the start sub-band and a bitmap representing that the terminal is capable of receiving system information; or
a frequency channel number of each sub-band in which the terminal is capable of receiving the system information, wherein the frequency channel number of each sub-band is represented by using a frequency spacing of the sub-band relative to an anchor sub-band.

16. A communications apparatus, applied to a terminal in a discrete narrowband communications system, and comprising at least one processor and a receiver, wherein:
the receiver receives, under control of the at least one processor, first indication information and second indication information that are sent by a network device, wherein the first indication information comprises:
a frequency channel number of a start sub-band in all discrete sub-bands of a serving cell in which the terminal is currently located;
a bitmap representing whether each sub-band in a frequency band belongs to the serving cell; and
a frequency spacing between sub-bands in the frequency band, wherein the frequency band is a frequency band to which all the discrete sub-bands of the serving cell belong; and
wherein the second indication information is used to indicate a specified quantity of consecutive logical sub-bands to the terminal in all the discrete sub-bands of the serving cell, wherein the specified quantity of consecutive logical sub-bands are allocated by the network device based on at least one of a load status of the serving cell of the terminal or a current service requirement of the terminal, wherein the specified quantity of consecutive logical sub-bands are a specified quantity of sub-bands with consecutive numbers in all the discrete sub-bands of the serving cell, wherein cyclic shift is performed between a logical sub-band number and an actual physical sub-band number of the specified quantity of consecutive logical sub-bands based on a subframe number or a slot number, and wherein the actual physical sub-band number is a sequence number of each of all the discrete sub-bands of the serving cell.

17. The apparatus according to claim 16, wherein the first indication information further comprises a quantity of all the discrete sub-bands of the serving cell.

18. The apparatus according to claim 16, wherein the receiver is further configured to:
receive third indication information sent by the network device, wherein the third indication information is used to indicate at least one piece of anchor sub-band information, and wherein the anchor sub-band information comprises at least one of the following information:
a frequency of an anchor sub-band;
a sequence number of the anchor sub-band in all the discrete sub-bands of the serving cell; or
a spacing of the frequency channel number of the anchor sub-band relative to the frequency channel number of the start sub-band.

19. The apparatus according to claim 16, wherein the apparatus further comprises a transmitter, and wherein the transmitter is configured to:
before the receiver receives the second indication information sent by the network device, send sub-band aggregation specification capability information to the network device, wherein the sub-band aggregation specification capability information is used to indicate a quantity of sub-bands of which aggregation is supported by the terminal.

20. The apparatus according to claim 16, wherein the receiver is further configured to:
receive fourth indication information sent by the network device, wherein the fourth indication information is used to indicate a sub-band in which the terminal receives a system message; and
wherein the fourth indication information carries one of the following information, to indicate the sub-band in which the terminal receives the system message:
the frequency channel number of the start sub-band and a bitmap representing that the terminal is capable of receiving system information; or
a frequency channel number of each sub-band in which the terminal is capable of receiving the system information, wherein the frequency channel number of each sub-band is represented by using a frequency spacing of the sub-band relative to an anchor sub-band.

21. A non-transitory computer-readable storage medium, wherein a computer program is stored on the storage medium, and wherein the computer program, when executed by at least one processor, instruct the at least one processor to perform operations comprising:
sending, by a network device, first indication information to a terminal, wherein the first indication information comprises:
a frequency channel number of a start sub-band in all discrete sub-bands of a serving cell in which the terminal is currently located;

a bitmap representing whether each sub-band in a frequency band belongs to the serving cell; and a frequency spacing between sub-bands in the frequency band, wherein the frequency band is a frequency band to which all the discrete sub-bands of the serving cell belong; and sending, by the network device, second indication information to the terminal, wherein the second indication information is used to indicate a specified quantity of consecutive logical sub-bands to the terminal in all the discrete sub-bands of the serving cell, wherein the specified quantity of consecutive logical sub-bands are allocated by the network device based on at least one of a load status of the serving cell of the terminal or a current service requirement of the terminal, wherein the specified quantity of consecutive logical sub-bands are a specified quantity of sub-bands with consecutive numbers in all the discrete sub-bands of the serving cell, wherein cyclic shift is performed between a logical sub-band number and an actual physical sub-band number of the specified quantity of consecutive logical sub-bands based on a subframe number or a slot number, and wherein the actual physical sub-band number is a sequence number of each of all the discrete sub-bands of the serving cell.

22. A non-transitory computer storage medium, wherein a computer program is stored on the storage medium, and wherein the computer program, when executed by at least one processor, instruct the at least one processor to perform operations comprising:

receiving, by a terminal, first indication information sent by a network device, wherein the first indication information comprises:

a frequency channel number of a start sub-band in all discrete sub-bands of a serving cell in which the terminal is currently located;

a bitmap representing whether each sub-band in a frequency band belongs to the serving cell; and a frequency spacing between sub-bands in the frequency band, wherein the frequency band is a frequency band to which all the discrete sub-bands of the serving cell belong; and receiving, by the terminal, second indication information sent by the network device, wherein the second indication information is used to indicate a specified quantity of consecutive logical sub-bands to the terminal in all the discrete sub-bands of the serving cell, wherein the specified quantity of consecutive logical sub-bands are allocated by the network device based on at least one of a load status of the serving cell of the terminal or a current service requirement of the terminal, wherein the specified quantity of consecutive logical sub-bands are a specified quantity of sub-bands with consecutive numbers in all the discrete sub-bands of the serving cell, wherein cyclic shift is performed between a logical sub-band number and an actual physical sub-band number of the specified quantity of consecutive logical sub-bands based on a subframe number or a slot number, and wherein the actual physical sub-band number is a sequence number of each of all the discrete sub-bands of the serving cell.

* * * * *